United States Patent
Ford

(10) Patent No.: US 10,424,215 B2
(45) Date of Patent: Sep. 24, 2019

(54) COMBAT TRAINING SYSTEM AND METHODS FOR OPERATING SAME

(71) Applicant: Combat Action LLC, Brighton, MI (US)

(72) Inventor: Jon A. Ford, Brighton, MI (US)

(73) Assignee: COMBAT ACTION LLC, Brighton, MI (US)

( * ) Notice: Subject to any disclaimer, the term of this patent is extended or adjusted under 35 U.S.C. 154(b) by 0 days.

(21) Appl. No.: 15/968,585

(22) Filed: May 1, 2018

(65) Prior Publication Data
US 2018/0374380 A1 Dec. 27, 2018

Related U.S. Application Data

(63) Continuation-in-part of application No. 14/536,575, filed on Nov. 7, 2014.

(60) Provisional application No. 61/917,391, filed on Dec. 18, 2013.

(51) Int. Cl.
*G09B 9/00* (2006.01)
*F41A 33/04* (2006.01)
*F41A 33/06* (2006.01)
*F41A 33/02* (2006.01)

(52) U.S. Cl.
CPC ............. *G09B 9/003* (2013.01); *F41A 33/02* (2013.01); *F41A 33/04* (2013.01); *F41A 33/06* (2013.01)

(58) Field of Classification Search
CPC .......... F41A 33/00; F41A 33/02; F41A 33/04; F41A 33/06; F41G 3/26
See application file for complete search history.

(56) References Cited

U.S. PATENT DOCUMENTS

| 6,254,394 | B1* | 7/2001 | Draper | F41G 3/26 434/11 |
| 2007/0190494 | A1* | 8/2007 | Rosenberg | A63F 13/12 434/11 |
| 2014/0186802 | A1* | 7/2014 | Quail | F41J 5/02 434/22 |
| 2018/0071645 | A1 | 3/2018 | Hugill et al. | |

* cited by examiner

*Primary Examiner* — Timothy A Musselman
(74) *Attorney, Agent, or Firm* — Mitchell Law PLLC; Matthew W. Mitchell

(57) ABSTRACT

A combat simulation system is disclosed herein. The system includes a plurality of simulation weapons each having a trigger configured to simultaneous control emission of a light beam and initiate a combustion event to generate noise and provide kickback, a plurality of wearable sensors, and a plurality of user devices each configured to determine a user's location. The system further includes an administration computing device for: administering a simulated mission, deploying virtual weapons having blast events defined by a maximum blast radius and a plurality of rings, monitoring user locations, user operating parameters, and status of mission objectives during a simulated mission; and enabling dynamic control of the simulated mission including user operating parameters, simulated event objects, and mission parameters associated with the simulated mission, and displaying a plurality of graphical images indicative of information and parameters associated with the simulated mission including the monitored user locations.

19 Claims, 30 Drawing Sheets

| | | | | | | Sort By | | SQUAD | NAME | | STATUS | |
|---|---|---|---|---|---|---|---|---|---|---|---|---|
| SQUAD | NAME | RANK | STATUS | KILLS | DEATHS | KDR | SCORE | WINS | LOSSES | WEAPONS | VEST | MAGAZINE | ROUNDS FIRED |
| ALPHA | user4 | E001 | 100 | 0 | 0 | 0 | 0 | 0 | 0 | NA | 1 | 1 | 0 |
| BRAVO | user3 | E001 | 100 | 0 | 0 | 0 | 0 | 0 | 0 | NA | 2 | 2 | 0 |
| BRAVO | user1 | E001 | 100 | 0 | 0 | 0 | 0 | 0 | 0 | NA | 7 | 7 | 0 |
| ALPHA | tjones | E001 | 100 | 0 | 0 | 0 | 0 | 0 | 0 | NA | 5 | 5 | 0 |
| BRAVO | user2 | E001 | 100 | 0 | 0 | 0 | 0 | 0 | 0 | NA | 0 | 0 | 0 |
| ALPHA | use6 | E001 | 0 | 0 | 0 | 0.0 | 750 | 0 | 0 | NA | 0 | 0 | 0 |
| ALPHA | user5 | E001 | 100 | 0 | 0 | 0 | 0 | 0 | 0 | m161002 | 4 | 4 | 0 |

CURRENT MISSION
MALLORY
Return to Map

SELECT USER ALL

Send Message

FIG. 5

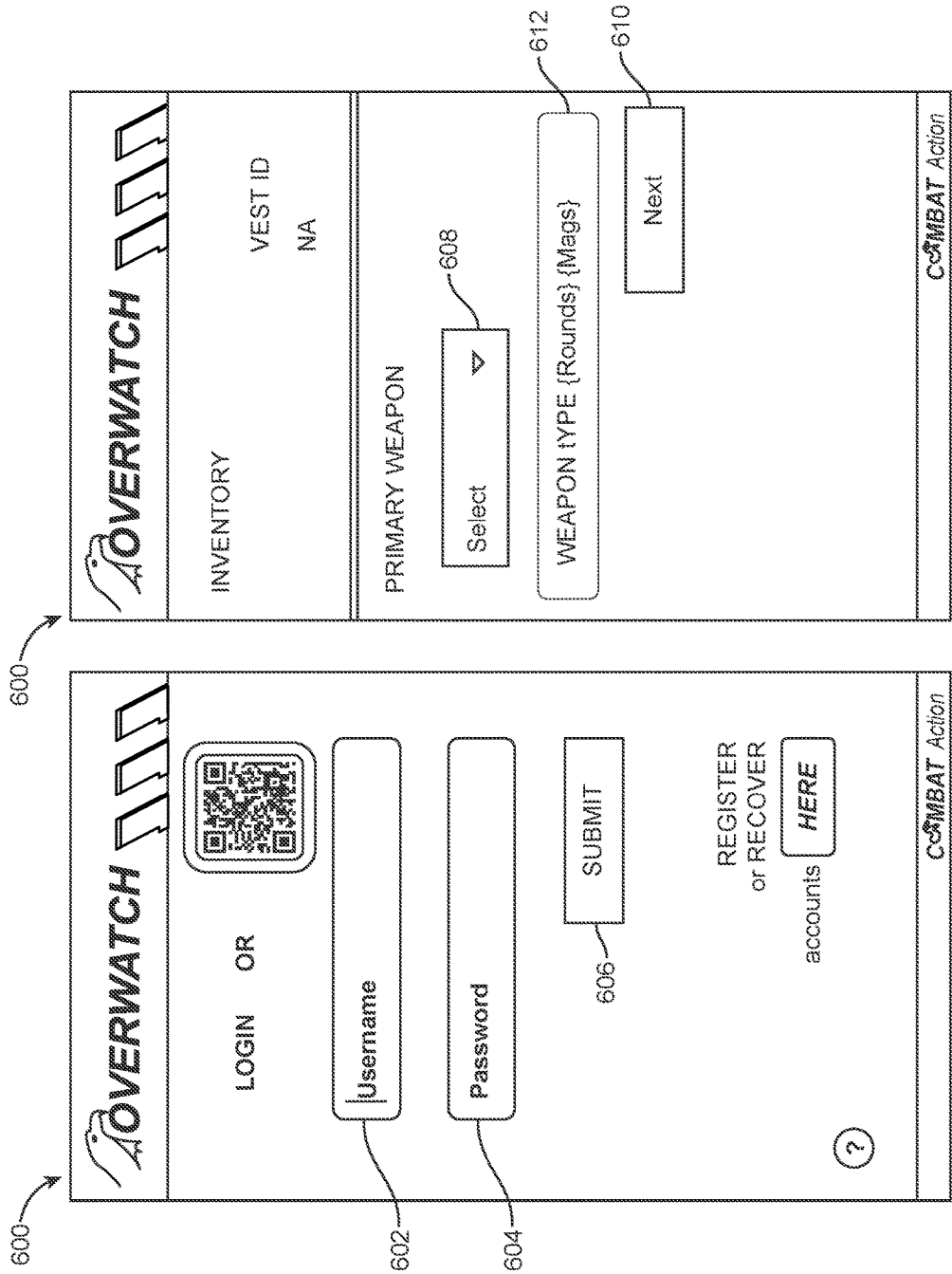

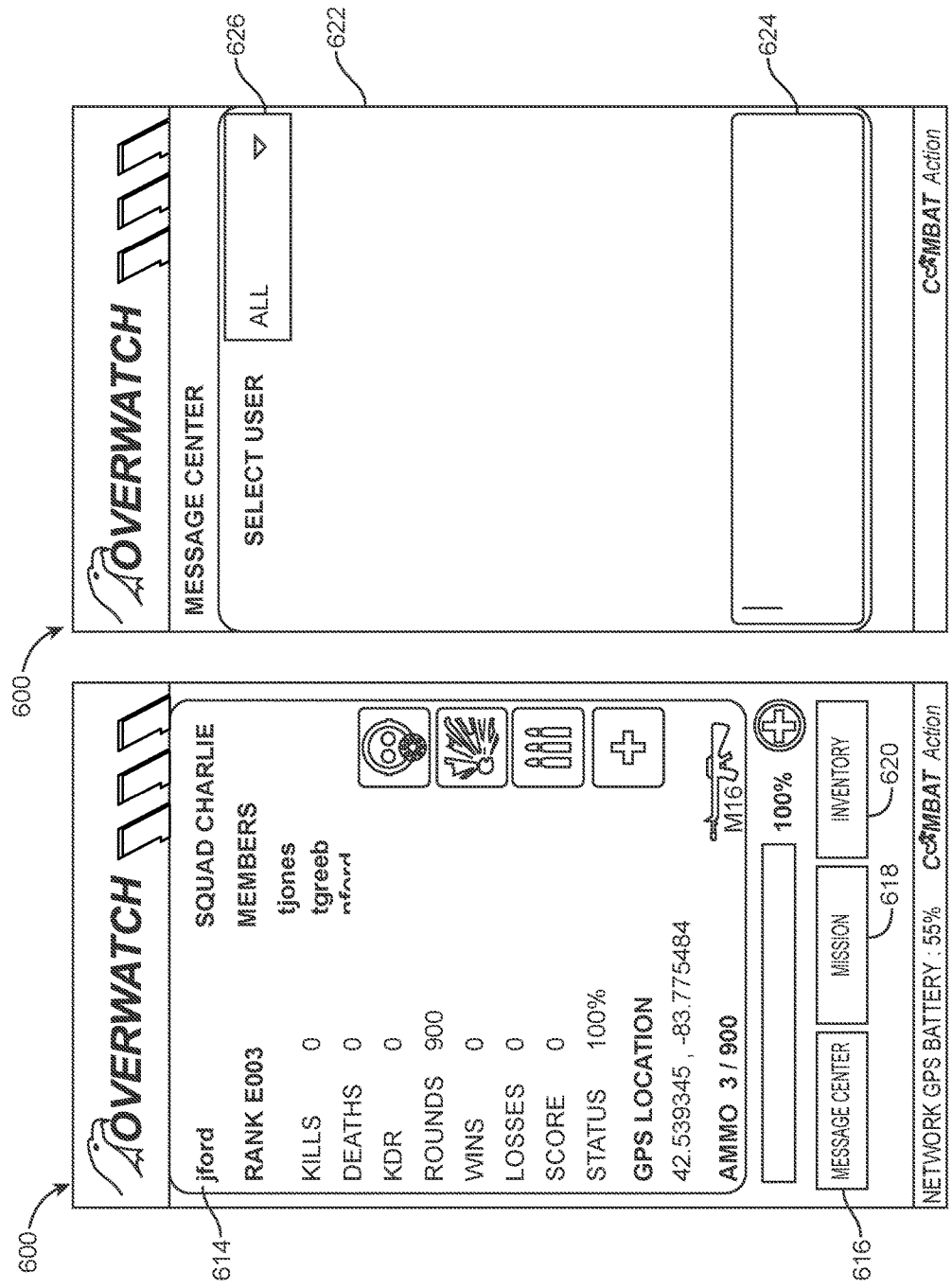

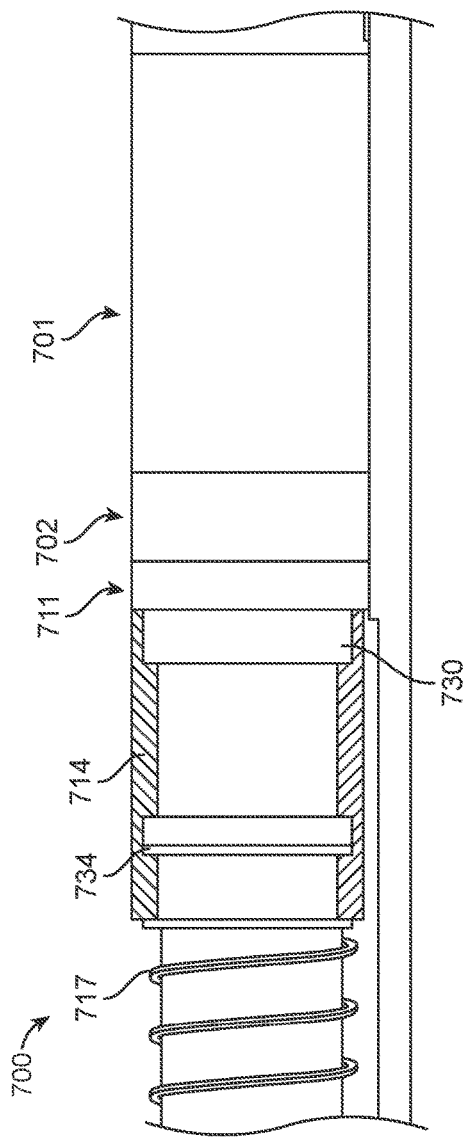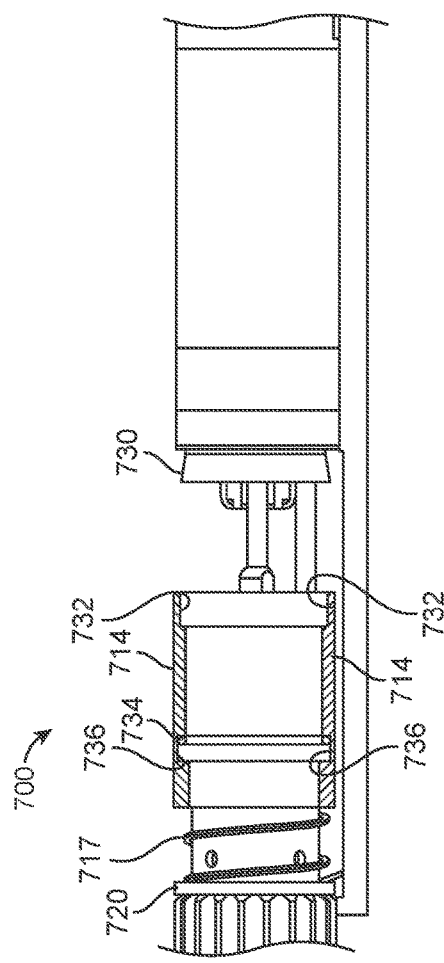
FIG. 16A
FIG. 16B

COMBAT TRAINING SYSTEM AND METHODS FOR OPERATING SAME

CROSS REFERENCE TO RELATED APPLICATIONS

This Application is a continuation-in-part application of application Ser. No. 14/536,575 filed on Nov. 7, 2014, which claims the benefit of U.S. Provisional Application No. 61/917,391 filed on Dec. 18, 2013. Each patent application identified above is incorporated here by reference in its entirety to provide continuity of disclosure.

TECHNICAL FIELD

This disclosure relates to live combat simulation, and more particularly to methods and apparatuses that may be used therein.

BACKGROUND

The statements in this section merely provide background information related to the present disclosure and may not constitute prior art.

Systems for simulating combat for military and police training are known in the art. Such systems provide participants with a simulated combat environment, typically utilizing simulated weapons, from which to train and learn different combat situations. The participants of a simulated combat environment may include, for example, soldiers, vehicles, non-hostile pedestrians or animals. The participants train under simulated realistic conditions, without the detrimental consequences of sustaining casualties associated with conventional armed non-virtual or non-simulated combat.

Many simulated training systems use virtual reality simulators in conjunction with modified or simulated weapons configured to interact with the virtual reality simulator. The modified or simulated weapons capture data about how the weapon is used and send that data to a computing device that uses the data to produce interactions with the simulated training system. One of the goals of the modified or simulated weapons used in these training systems is to mimic the use of the weapon as it would be used in the field. The current state of the art is to use mock-ups that look and feel as close to the real weapons as possible or to make significant modifications to a real weapon that typically prevent the weapon from live fire use.

One known system includes multiple integrated laser-weapon devices. In this type of system, the participants simulate shooting by actuating a laser transmitter, which simulate the potency of real projectiles. Additionally, the participants possess optical detectors, which detect the laser light impinging thereon; the system records each such detection as a hit. The laser beam transmitted by each participant may be encoded with a unique player code, thereby identifying the shooter of every hit.

Another known combat simulation system is a paint-ball game system, wherein players of opposing teams target one another with paint-ball guns. Each player dresses in paint-protective wear, and possesses a paint-ball gun. A player from one team, holding paint-ball gun, launches balls that contain paint of a predetermined color representing the team of that player. The player launches that paint-ball toward a player from an opposing team. When the ball strikes the opposing team player, the paint present within the ball is released onto the paint-protective wear of that opposing team player, thereby visually marking that player as hit. Casualty assessment is confirmed visually, according to the color present on the paint-protective wear of the players.

One problem with known simulation systems and simulation weapons is they do not accurately match the feel and operation of a real weapon, e.g., the discharge sound and kickback functions are not truly simulating. Hence, there is a continuing need for greater real-world simulation of actual weapons integrated into a simulation system.

Another problem with known simulation systems is the limited live monitoring and inability to deviate from the set training events. Hence there is a need to provide an administrator or systems manager the ability to monitor action in a live or near live state and make adjustments to the playing conditions and/or operating parameters of players and devices.

There is a further need in the art to provide a simulation system that can provide communication via a mesh network over a plurality of devices. Communication can include voice and data over various devices including simulation weapons or various simulation devices.

SUMMARY

Disclosed herein are aspects of systems, methods, and apparatuses for electronic weapons training including one or more training vests having laser light detectors, a controller and a wireless communications link; one or more training weapons associated with the one or more training vests having a laser, a controller and a wireless communications link; one or more mobile computing devices associated with the one or more training vests having a display, a GPS and a wireless communications link; one or more administrator computing devices having a display and a wireless communications link; a wireless network providing communications among the one or more mobile computing devices and the one or more administrator computing devices; and one or more RFID cards.

Also disclosed herein are aspects of systems, methods, and apparatuses for electronic weapons training including associating one or more training weapons with a training vests using an RFID card and wireless communications; associating one or more training vests with one or more administrator computing devices using an RFID card and wireless communications; and wherein the administrator computing device can communicate wirelessly with the one or more associated training vests to: (A) display the locations of the one or more training vests; (B) record laser light detected by the one or more training vests; (C) calculate damage information based on the recorded laser light; and (D) transmit damage information to the training vests.

Weapons training systems can be used to train military recruits, civilian police departments or recreational participants in war-gaming. One aspect of the disclosed embodiment is to provide training equipment that simulates actual combat or police events without requiring firing live ammunition or blanks, since even blank firing can cause injury or death. Aspects of disclosed embodiments simulate actual weapons use by using electronically equipped vests and weapons to simulate actual weapons discharge without causing harm or injury to the training participants. The use of electronically equipped training vests permits the use of un-armed participants or "civilians" to be used in the training.

Certain embodiments of the invention include a feature of the a central administration computing device in communication with a plurality of mobile devices associated with vests and weapons in the weapons training system 100 to assess weapon usage and damage received. The administration computing device can download damage assessments to the mobile computing devices to be used by "medics" in the weapons training to rehabilitate or remove a user from the training depending upon the level of damage received.

Certain embodiments of the invention include a feature of the central administration computing device maintaining a database including the events uploaded by the mobile computing devices to enable participants to review and evaluate a training session. The central administration computing device can also upload "missions" or objectives to the participants in the weapons training during the training and score the participants on how well the missions or objectives were accomplished.

Certain embodiments of the invention include a feature of the simulation weapons and vests including controllers which communicate with an associated mobile computing device. The controllers also communicate with an RFID card to maintain an association as a unit assigned to a user. The controllers keep track of "ammunition" levels and can cause the electronic weapons to emit encoded light radiation in response to a trigger pull, for example. The controllers can keep track of sensors attached to the vest or other points on the user to detect incoming fire from electronic weapons and register "hits". The light emitted from the electronic weapons can be encoded to permit the controller to identify which electronic weapon caused the damage.

Certain embodiments of the invention include a feature of the controllers providing audio feedback, emitting sounds of gunfire as the trigger is pulled and emitting sounds of damage received as a vest is hit from incoming fire, for example. The electronic weapons and vests are designed to simulate actual military or police issue items in order to make the weapons training realistic.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIG. 5 shows, data associated with a current or selected simulated mission may be displayed to an admin-user, in accordance with an embodiment of the present disclosure;

FIGS. 12A-12H show exemplary interfaces for use by a player-user, in accordance with an embodiment of the present disclosure;

FIG. 16A is a partial cross-sectional view illustrating a noise generating system in an idle state, in accordance with an embodiment of the present disclosure;

FIG. 16B is a partial cross-sectional view illustrating a noise generating system in a fired state, in accordance with an embodiment of the present disclosure;

DETAILED DESCRIPTION

Figure 1A:
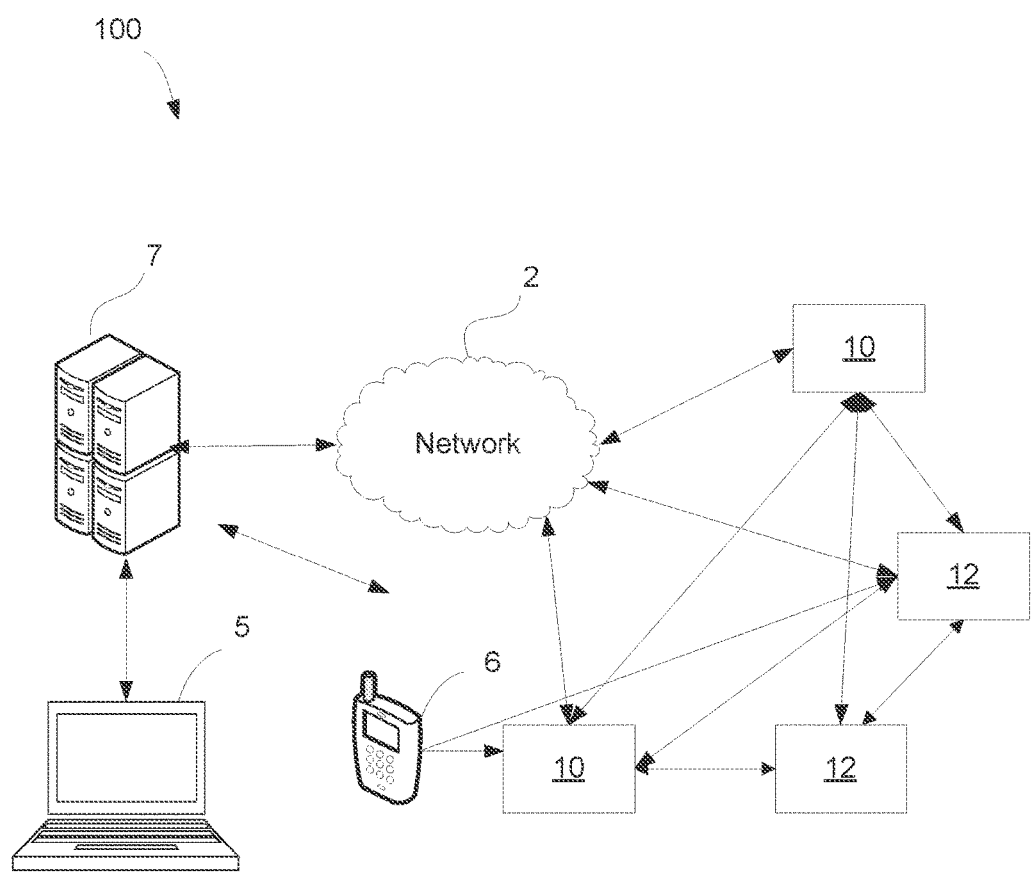
FIG. 1A schematically shows an exemplary combat simulation system including a computing device, a server system, a network, a mobile device, at a simulation weapon, and a player-user vest, in accordance with an embodiment of the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based upon" is not exclusive and allows for being based on additional factors not described, unless the context clearly dictates otherwise. The word "exemplary" is used herein to mean "serving as an example, instance, or illustration." Any embodiment described herein as "exemplary" is not necessarily to be construed as preferred or advantageous over other embodiments.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1A schematically shows an exemplary combat simulation system 100 that may help implement the methodologies of the present disclosure. The system 100 includes a computing device 5, a server system 7, a network 2, a mobile device 6, at least one simulation weapon 10, and at least one user vest 12.

As shown in FIG. 1A, the computing device 5 is communicatively connected to the server 7, it is understood that the device 5 may be connected via the network 2 or any direct or indirect communication path without departing from the teachings herein. The mobile device 6 may be configured to communicate directly with the devices within the system 100 or through the network 2. The weapon 10 and vest 12 may be configured to communicate directly with the devices within the system 100. Components of the system 100 are shown in FIG. 1 as single elements. Such illustration is for ease of description and it should be recognized that the system 100 may include multiple additional mobile, computing devices, simulated weapons, and vests.

The network 2 may be any suitable series of points or nodes interconnected by communication paths. The network 2 may be interconnected with other networks and contain sub networks network such as, for example, a publicly accessible distributed network like the Internet or other telecommunications networks (e.g., intranets, virtual nets, overlay networks and the like). The network 2 may facilitates the exchange of data between and among the computing device 5, the mobile device 6, the server 7, the simulated weapons 10, and the vests 12 although in various embodiments the computing device 5 may be directly connected to the server 7.

The computing device 5 and the server system 7 may each be: various embodiments of a computer including high-speed microcomputers, minicomputers, mainframes, and/or data storage devices. The server system 7 preferably executes database functions including storing and maintaining a database and processes requests from the mobile device 6 and the computing device 5 to extract data from, or update, a database as described herein below. The server 7 may additionally provide processing functions for the mobile device 6 and the computing device 5 as will become apparent to those skilled in the art upon a careful reading of the teachings herein.

In addition, the computing device 5, the mobile device 6, the server 7 may each include one or more applications that the user or administrator may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the Internet or world wide web. In one embodiment, the computing device 5, at least one mobile device 6, and the server 7 are embodied in a single administration computing device.

Figure 1B:
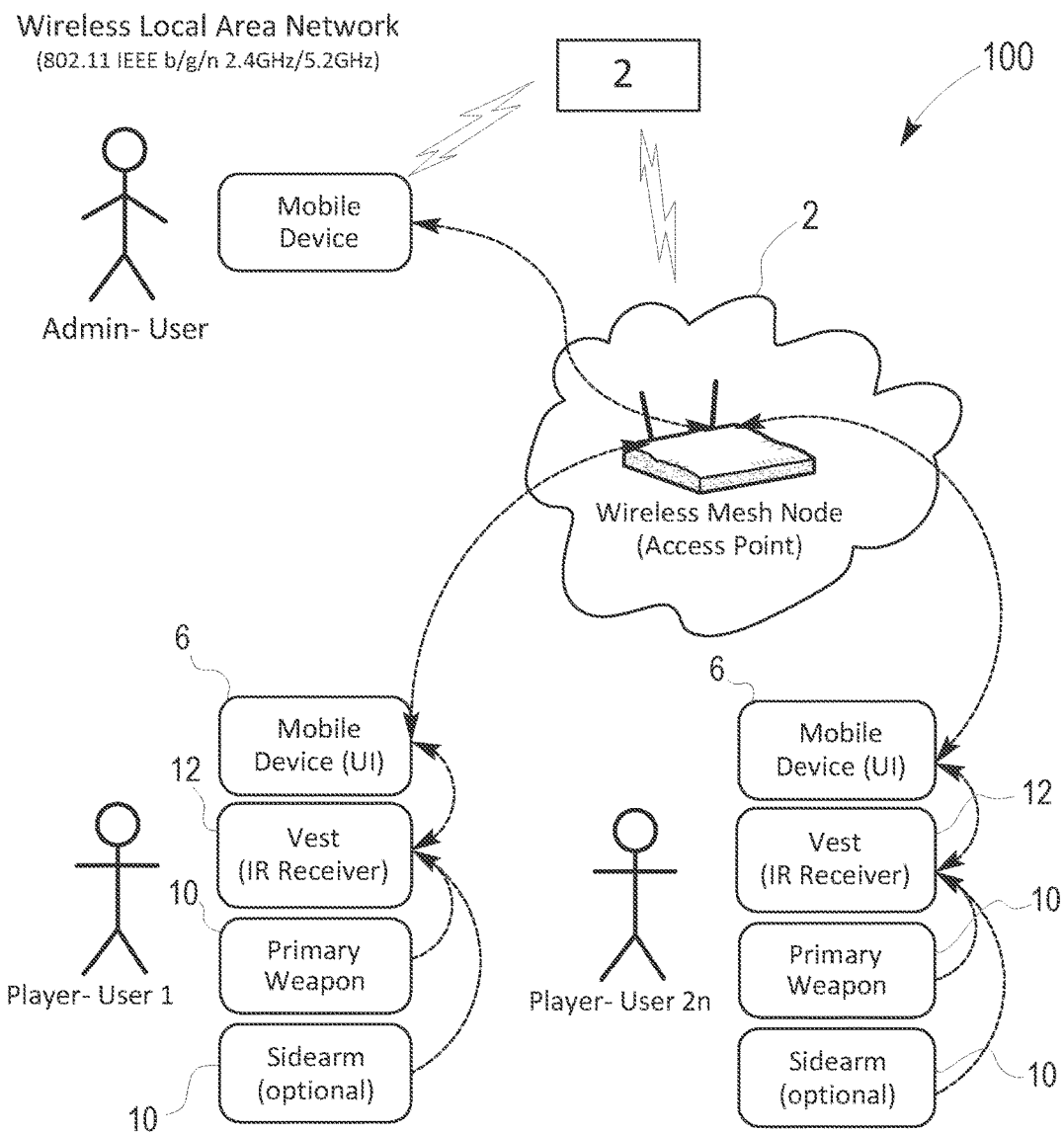
FIG. 1B schematically shows an exemplary embodiment of the system, in accordance with an embodiment of the present disclosure.

FIG. 1B schematically shows an exemplary embodiment of the system 100. As FIG. 1B shows, each player-user is associated with a mobile device 6, a weapon 10, and a vest 12. In one embodiment, a weapon 10 and a vest 12 are communicatively paired and associated with a player-user. In one embodiment, a player-user may be associated with a sidearm weapon or an exploding device such as a simulated grenade. In one embodiment, the weapons 10 are configured to communicate with the vest 12. The vest 12 is configured to communicate with the weapons 10 and the mobile device 6. The mobile device 6 is then configured to communicate with the network 2. From the network 2, the player-users may communicate among the player-users, in accordance with group and user permissions and mission parameters as described herein below. As FIG. 1B shows, the admin-user may utilize a mobile device 6 to control the simulated mission and system operation including accessing and administering functions of the server 7, in one embodiment.

Aspects of the disclosed embodiments can network a user's electronically equipped weapons 10 and vest 12 and maintain an association between the weapons 10 and vest 12 using radio frequency identification (RFID) tags. The vest 12 can be associated with a mobile computing device 6 having a network interface. The mobile device 6 can include positioning system capabilities such as via the global positioning system (GPS) which transmits the location of the user and the condition of the weapon 10 and the vest 12 to a central administration such as the server 7. The condition of the vest 12 can include information regarding any simulated damage received by the user from simulated fire from other electronic weapons 10 in the weapons training.

Figure 1C:
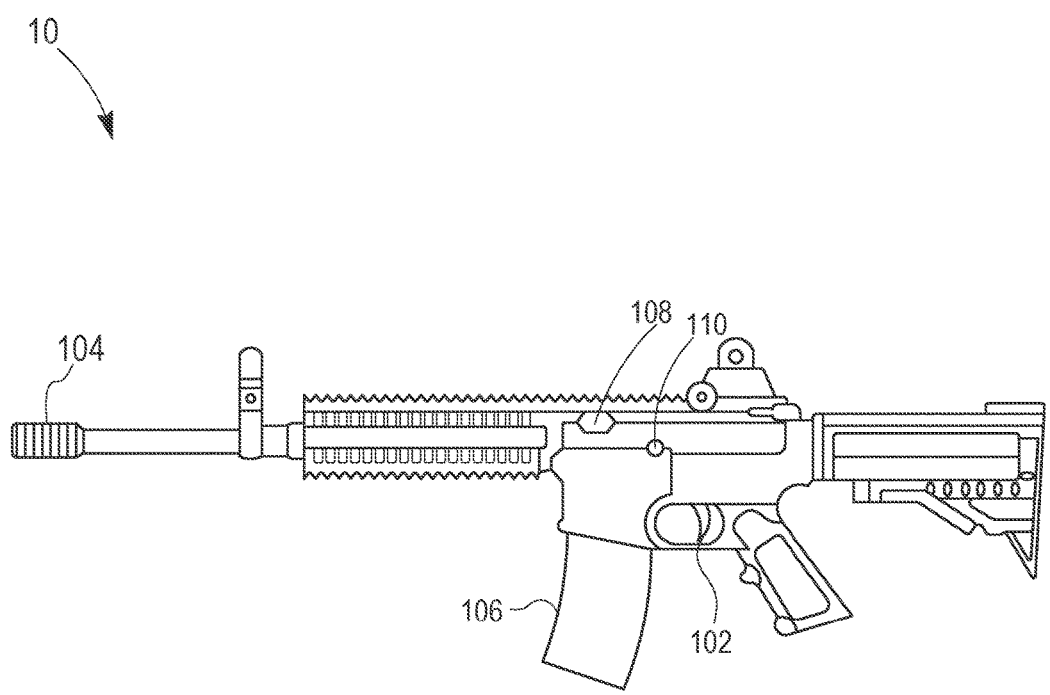
FIG. 1C shows a side view of an exemplary simulation weapon, in accordance with an embodiment of the present disclosure.

FIG. 1C shows a side view of an exemplary simulation weapon 10. As FIG. 1C shows, the weapon 10 includes a trigger 102 for actuation of a lighting device 104. Actuation of the trigger 102 activates the lighting device 104 simulating a weapon "firing" by generating a light beam. In one embodiment, the lighting device 104 is an LED device. In one embodiment, the lighting device 104 produces a predetermined color associated with a combat squad. For example, in one embodiment, each weapon associated with player-users of a combat squad may generate a blue light while weapons of another combat squad generate a green light. In one embodiment, the weapon includes a magazine 106. The magazine is preferably sized and weighed corresponding to conventional magazine for non-simulated weapon. In one embodiment, the weapon 10 includes a speaker 108 for simulating audio output of a conventional weapon, e.g., bullet firing blasts. In one embodiment, the weapon 10 includes a forward assist mechanism and a bolt release lever 110. In one embodiment, the weapon 10 includes an electronic recoil device configured to actuate upon actuation of the trigger 102 and further configured to simulate recoil experienced by a user of a real weapon.

Figure 1D:
FIG. 1D shows a front view of an exemplary vest, in accordance with an embodiment of the present disclosure.

FIG. 1D shows a front view of an exemplary vest 12. As FIG. 1D shows, the vest 12 can include one or more sensors 120. The sensors 120 are preferably spaced apart on an exterior surface of the vest 12. In one embodiment, the sensors 120 are laser light sensors. In one embodiment, the sensors 120 are infrared light detecting sensors. In one embodiment, the sensors are disposed for 360-degree detection and activation. In one embodiment, the sensors 120 are placed on the front and back of the vest 12. In one embodiment, the vest 12 includes one or more lights 122 configured to selectively generate light, for example, upon actuation of a sensor 120 by a combatant. In one embodiment, the lights 122 have a plurality of colors. In one embodiment, the vest 12 includes vibrating means for hit simulation. In one embodiment, the vest includes a speaker 124 configured to simulate sounds associated with a hit or communications from player-users and admin-users. In one embodiment, the speaker 124 is configured to selectively play audio during simulated missions including one or more sounds associated with hits, wounds, explosions, airstrikes, deaths, UAV, chemical attacks, mortar attacks and status.

Figure 2:
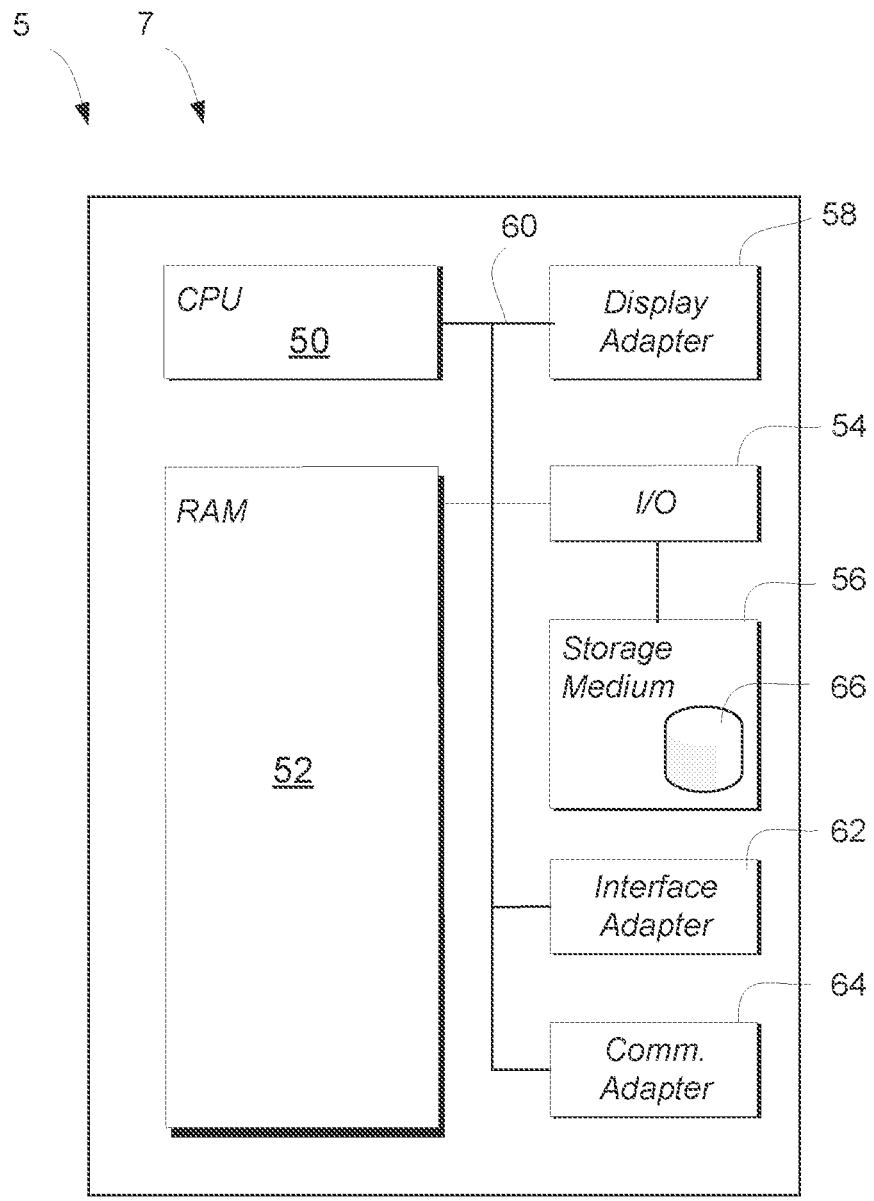
FIG. 2 schematically shows an exemplary computing device, in accordance with an embodiment of the present disclosure.

FIG. 2 schematically shows an exemplary computing device 5. FIG. 2 is additionally representative of components within an exemplary server 7, in one embodiment. The computing device 5 and server 7 include a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for communicatively connecting user input devices such as a keyboard, a mouse, and/or a microphone, to the system bus 60, and a communication adapter 64 for connecting the computing device 5 to the network 2. In one embodiment, the communication adapter 64 is configured to communicate directly with other devices such as the mobile device 6, the simulated weapon 10, and/or the vest 12. The storage medium 56 may be configured to store, access, and modify a database 66, and is preferably configured to store, access, and modify structured or unstructured databases for data including, for example, relational data, tabular data, audio/video data, and graphical data.

The central processing unit 50 is preferably one or more general-purpose microprocessor or central processing unit(s) and has a set of control algorithms, comprising resident program instructions and calibrations stored in the memory 52 and executed to provide the desired functions. As one skilled in the art will recognize, the central processing unit 50 may have any number of processing "cores" or electronic architecture configured to execute processes in parallel. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

Figure 3:
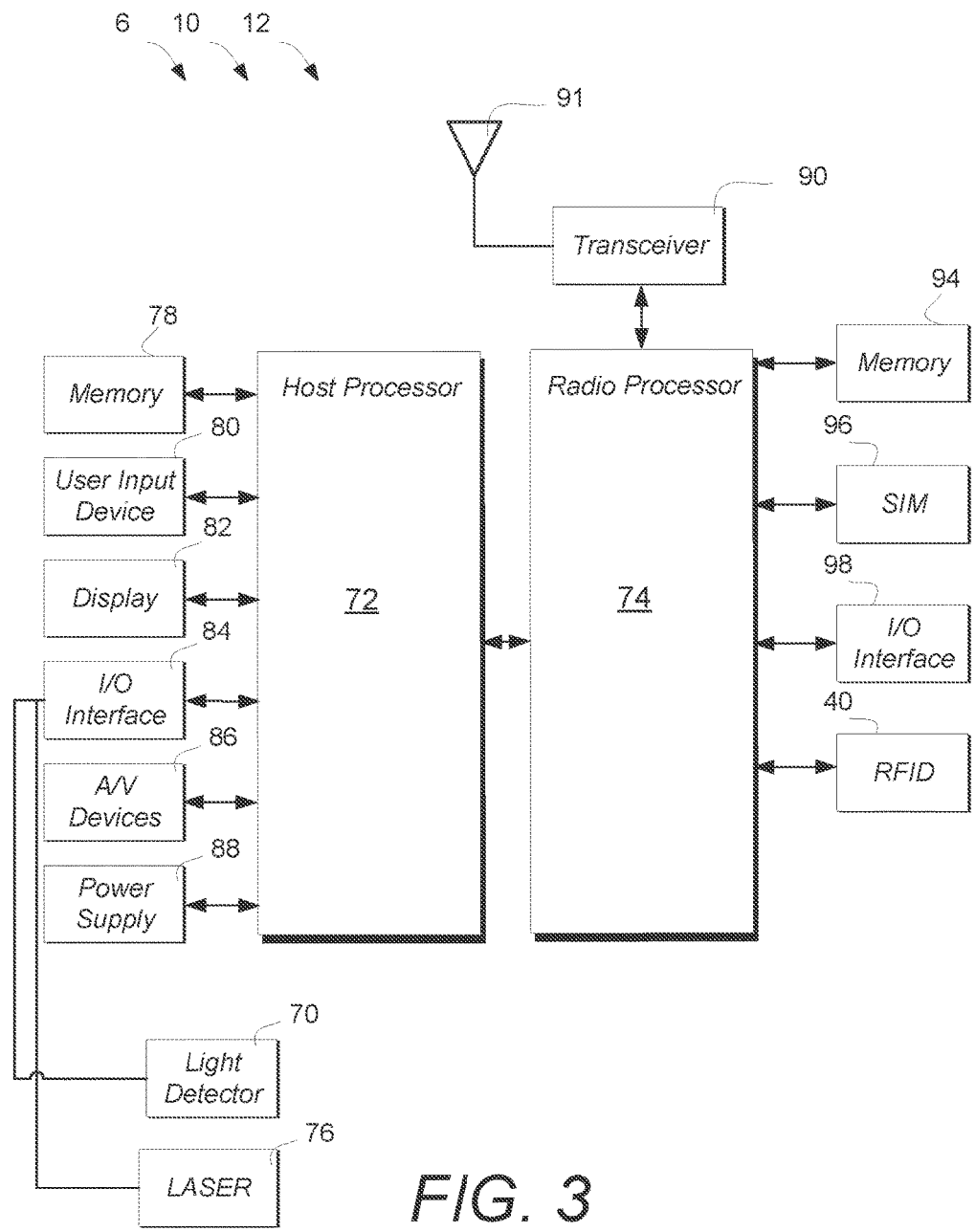
FIG. 3 schematically shows an exemplary block diagram embodiment of the device, the weapon, and the vest, in accordance with an embodiment of the present disclosure.

FIG. 3 schematically shows an exemplary block diagram embodiment of the device 6, weapon 10, and vest 12 configured to operate in a mobile environment. As shown in FIG. 3, the device 6 weapon 10, and vest 12 may include a dual processor architecture, including a host processor module 72 and a radio processor 74 (e.g., a base band processor or modem) although the functions therein may be implemented as a single processor, in some embodiments. The host processor module 72 and the radio processor 74 may be configured to communicate with each other using an interface. The device 6, weapon 10, and vest 12 may each additionally include any digital and/or analog circuit elements, comprising discrete and/or solid state components, suitable for use with the embodiments disclosed herein. One skilled in the art will recognize upon a careful reading of the teachings herein that the radio processor may be omitted in a wired embodiment of the device 6.

The host processor module 72 may be configured to execute various computer programs (e.g., software, firmware, or other code) such as application programs and system programs to provide computing and processing operations for the device 6, the weapon 10, and the vest 12. The radio processor 74 may be responsible for performing data communications operations for the device 6, the weapon 10, and the vest 12 such as transmitting and receiving data information over one or more wireless communications channels. Although the host processor module 72 and the radio processor 74 are shown and described as separate processors, such an illustration is for ease of description and it should be recognized that the functions performed by the host processor module 72 and the radio processor 74 may be combined on a single chip.

In various embodiments, the host processor module 72 may be implemented as a host central processing unit ("CPU") using any suitable processor or logic device, such as a general purpose processor, or other processing device in alternative embodiments configured to provide processing or computing resources to the device 6, the weapon 10, and the vest 12. For example, the host processor module 72 may be responsible for executing various computer programs such as application programs and system programs to provide computing and processing operations for the device 6, the weapon 10, and the vest 12. The application software may provide a graphical user interface ("GUI") to communicate information to a user. The computer programs may be stored as firmware on a memory associated with processor 72, may be loaded by a manufacturer during a process of manufacturing the device 6, the weapon 10, and the vest 12, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system, a kernel, device drivers, programming tools, utility programs, software libraries, an application programming interface ("API"), a GUI, and so forth.

The memory module 78 is preferably coupled to the host processor module 72. In various embodiments, the memory module 78 may be configured to store one or more computer programs to be executed by the host processor module 72. The memory module 78 may be implemented using any machine-readable or computer-readable media capable of storing data such as volatile memory or non-volatile memory, removable or non-removable memory, erasable or non-erasable memory, writeable or re-writeable memory, and so forth. Although the memory module 78 is shown as being separate from the host processor module 72 for purposes of illustration, in various embodiments some portion or the entire memory module 78 may be included on the same integrated circuit as the host processor module 72. Alternatively, some portion or the entire memory module 78 may be disposed on an integrated circuit or other medium (e.g., solid state drive) external to the integrated circuit of the host processor module 72.

A user input device 80 may be coupled to the host processor module 72. The user input device 80 may include, for example, an alphanumeric, numeric key layout and an integrated number dial pad. The device 6, the weapon 10, and the vest 12 also may include various keys, buttons, and switches such as, for example, input keys, preset and programmable hot keys, left and right action buttons, a navigation button such as a multidirectional navigation button, power/end buttons, preset and programmable shortcut buttons, a volume rocker switch, a ringer on/off switch having a vibrate mode, a keypad and so forth.

The host processor module 72 may be coupled to a display device 82. The display device 82 may include any suitable visual interface for displaying content to a user of the device 6, such as a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program. In one embodiment, the weapon 10 and the vest 12 are not coupled to a display device 82. In one embodiment, the mobile device 6 is used to display information and data associated with a selected weapon 10 or vest 12.

An I/O interface 84 is preferably coupled to the host processor module 72. The I/O interface 84 may include one or more I/O devices such as a serial connection port, an infrared port, wireless capability, and/or integrated 802.11x (WiFi) wireless capability, to enable wired (e.g., USB cable) and/or wireless connection to a local or networked computer system, such as the computing device 5, the mobile device 6, one of the weapons 10, and one of the vests 12.

The device 6, the weapon 10, and the vest 12 may each include an audio/video ("A/V") module 86 coupled to the host processor module 72 for communicatively connecting and communicating therebetween to various audio/video devices. The A/V module 86 may be configured to support A/V capability of each of the device 6, the weapon 10, and the vest 12 including components such as, a microphone, one or more speakers, an audio port to connect an audio headset, an audio coder/decoder (codec), an audio player, a video codec, a video player, and so forth. The A/V input module 86 may include an imaging module configured to capture digital images. The imagining module may include an optical sensor, e.g., a charged coupled device (CCD) or a complementary metal-oxide semiconductor (CMOS) optical sensor to facilitate camera functions, such as recording photographs and video clips. The image frames may be processed by the memory 78 or displayed on the display 82.

A power supply 88 configured to supply and manage power to components of the device 6, the weapon 10, and the vest 12 is preferably coupled to the host processor module 72. In various exemplary embodiments, the power supply 88 may be implemented by a rechargeable battery, such as a removable and rechargeable lithium ion battery to provide direct current ("DC") power, and/or an alternating current ("AC") adapter to draw power from a standard AC main power supply.

As described herein above, the radio processor 74 may perform voice and/or data communication operations for each of the device 6, the weapon 10, and the vest 12. For example, the radio processor 74 may be configured to communicate voice information and/or data information over one or more assigned frequency bands of a wireless communication channel. The radio processor 74 may be implemented as a communications processor using any suitable processor or logic device, such as a modem processor or baseband processor. The radio processor 74 may include, or be implemented as, a digital signal processor ("DSP"), a media access control ("MAC") processor, or any other type of communications processor in accordance with the described embodiments. Memory 94 may be coupled to the radio processor 74. Although memory 94 is shown as being separate from and external to the radio processor 74 for purposes of illustration, in various embodiments some portion may be included on the same integrated circuit as the radio processor 74. Further, the host processor module 72 and the radio processor 74 may share a single memory.

The device 6, the weapon 10, and the vest 12 may each include one or more transceivers 90 coupled to the radio processor 74, each transceiver 90 may be configured to communicate using a different types of protocol, communication ranges, operating power requirements, RF sub-bands, information types (e.g., voice or data), use scenarios, applications, and so forth. For example, the transceiver 90 may include a Wi-Fi transceiver and a cellular or WAN transceiver configured to operate simultaneously. The transceiver 90 may be implemented using one or more chips as desired for a given implementation. Although transceiver 90 is shown as being separate from and external to the radio processor 74 for purposes of illustration, in various embodiments some portion may be included on the same integrated circuit as the radio processor 74. The transceiver is preferably connected to an antenna 91 for transmitting and/or receiving electrical signals. As shown in FIG. 3, the antenna 91 may be coupled to the radio processor 74 through transceiver 90.

A SIM device 96 may be coupled to radio processor 74. The SIM device 96 may be implemented as a removable or non-removable smart card configured to encrypt voice and data transmissions and to store user-specific data for allowing a voice or data communications network to identify and authenticate the user. The SIM device 96 also may store data such as personal settings specific to the user.

An I/O interface 98 may be coupled to the radio processor 74. The I/O interface 98 may include one or more I/O devices to enable wired (e.g., serial, cable, etc.) and/or wireless (e.g., WiFi, short range, etc.) communication between the device 6 and one or more external computer systems. In one embodiment, the vest 12 each include a laser light detector 70 connectable through the I/O interface 98. In one embodiment, the weapon 10 includes a laser light emitter 76 actuateable using a trigger of the weapon 10.

In one embodiment of the mobile device 6, a radio-frequency identification (RFID) reader 40 may be coupled to the radio processor 74 or the host processor 72. In one embodiment, functions of the RFID reader 40 are incorporated into the radio processor 72 enabling the mobile device 6 to utilizes the transceiver 90 and antenna 91 to carry out functions of the RFID reader 40. The RFID reader 40 is configured to read identification information stored on an RFID tag by use of radio waves. In one embodiment, an RFID tag is formed of a microchip that is attached to an antenna and upon which is stored a unique digital identification number. In one embodiment, each weapon 10 and vest 12 includes a unique RFID identifier, identifiable via the RFID reader 40 of the mobile device 6.

In various embodiments, one or more of the device 6, weapon 10, and the vest 12 can include location or position determination capabilities. One or more position determination techniques can be utilized including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFTL") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc. Position determination techniques may be based on signals from one or more nearby cellular towers, one or more Wi-Fi access points (in which position is determined at least in part by collecting addresses of nearby wireless access points and comparing the addresses to a pre-stored database which associates addresses to geographic position), or other techniques. Location information can be communicated upon determination, at various intervals, upon occurrence of trigger events, upon requests, or the like. For example, location information can be transmitted at the request of one or more network nodes and/or devices. By way of another example, the server 7 can use network elements to determine the location of one or more of the device 6, weapon 10, and vest 12 as described herein above.

In various embodiments, one or more of the mobile device 6, weapon 10, and the vest 12 may include dedicated hardware circuits or structures, or a combination of dedicated hardware and associated software, to support position determination. For example, the transceiver 90 and the antenna 91 may include GPS receiver or transceiver hardware and one or more associated antennas coupled to the radio processor 74 to support position determination.

Figure 4A:
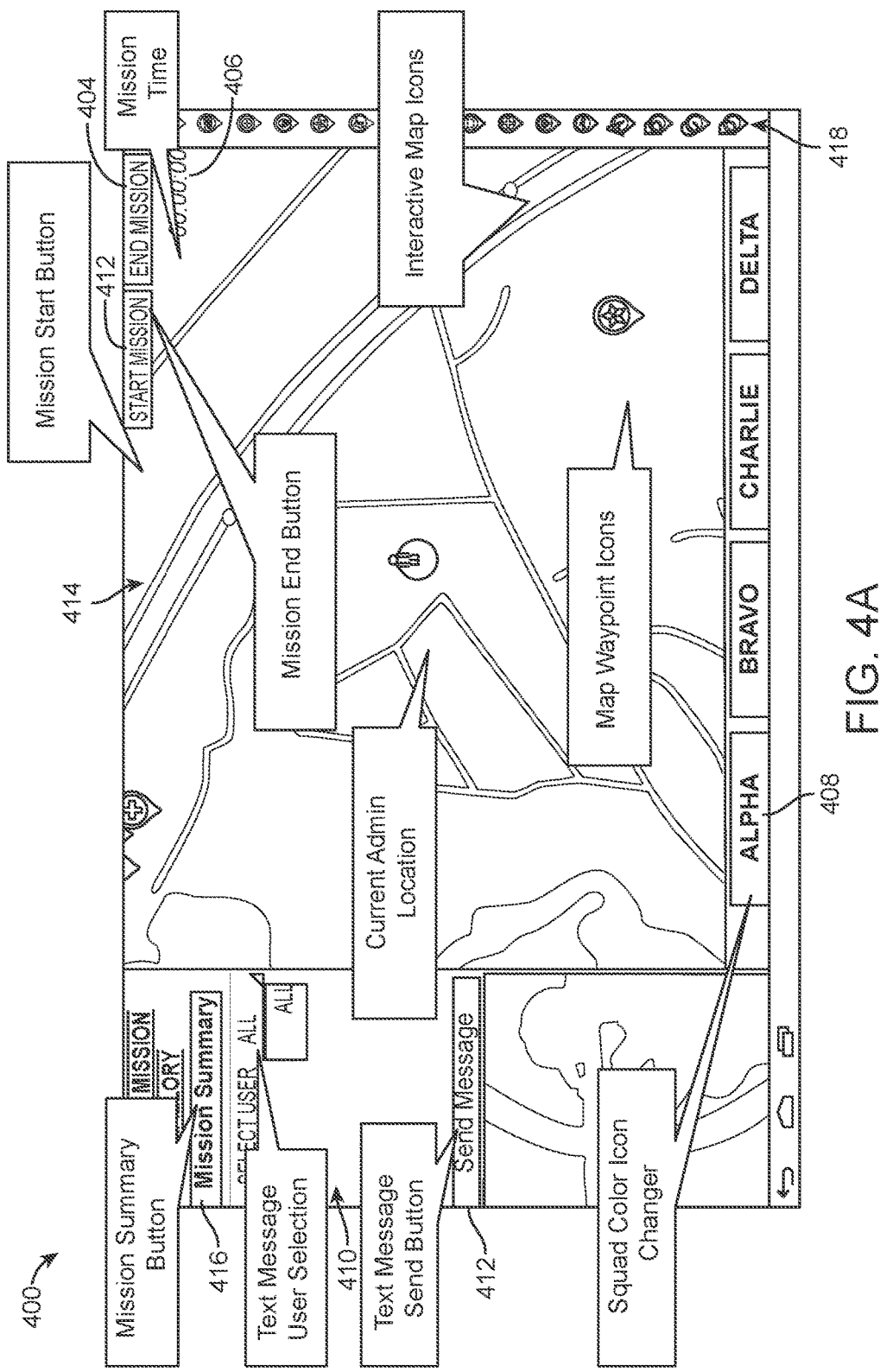
FIG. 4A shows an exemplary administration interface illustrative of a current simulated mission area, in accordance with an embodiment of the present disclosure.

FIG. 4A shows an exemplary administration interface 400 illustrative of a current simulated mission area. The interface 400 is configured at least to: (1) display a plurality of graphical images indicative of information and parameters associated with a simulated mission; (2) provide navigational control of the system, and system components, and control operations of the simulated mission. From the interface 400, the admin-user may start the mission 402 and end the mission 404. In one embodiment an elapsed time period 406 is shown in the interface 400. In one embodiment, the interface 400 enables a user to toggle among map views via one or more navigational buttons 408 showing combat squads or player groups, e.g., APPHA, BRAVO, CHARLIE, DELTA, etc. The groups may each be assigned a color.

In one embodiment, the admin-user may send messages to a selected player, selected combat squad, or all users via a message field 410 and message send control button 412. The interface 400 preferably includes a map view area 414. In one embodiment, the map view area 414 is dynamic, enabling an admin-user to control simulated play by moving, generating, editing, or otherwise manipulating simulated game or event objects such as waypoints, weapons depots, ammo reload areas, supply areas, and medical areas. In one embodiment, the admin-user may control player operating parameters as described herein below by clicking or otherwise selecting a desired player. In one embodiment, the admin-user may jam or partially disable a selected player's weapon.

In various embodiments of the interface 400, the map view module 414 may be configured to enable an admin-user to do one or more of the following: (1) zoom in and out on the map view module 414; (2) adjust mission event objects; (3) add mission event objects; (4) view player locations; (5) view player statistics and player operating metrics (6) view mission statistics and mission operating metrics, e.g., killed in action, wounded players, player health; (7) adjust ammo on a selected player's weapon, e.g., increase or reduce quantity; and (8) jam a selected player's weapon.

In one embodiment, a simulated mission is configured to randomly or periodically jam weapons associated with the simulated mission. Jamming the weapons during a simulated mission further simulates a real-word combat environment. To unjam a weapon, a player-user must perform a sequence of steps: (1) slap the magazine upward actuating an internal spring pin in the magazine's well; (2) pull a charging handle rearward; (3) release the charging handle; and (4) tap a forward assist assembly. Upon successful execution of the unjamming sequence, the weapon 10 is activated to fire in the simulated mission.

Navigational and control module 418 can include one or more event objects. In one embodiment, the event objects may be dragged onto the map view module 414 by the admin-user. In one embodiment, dragging the event object to the map view module associates a selected event object with a particular location.

Figure 4B:
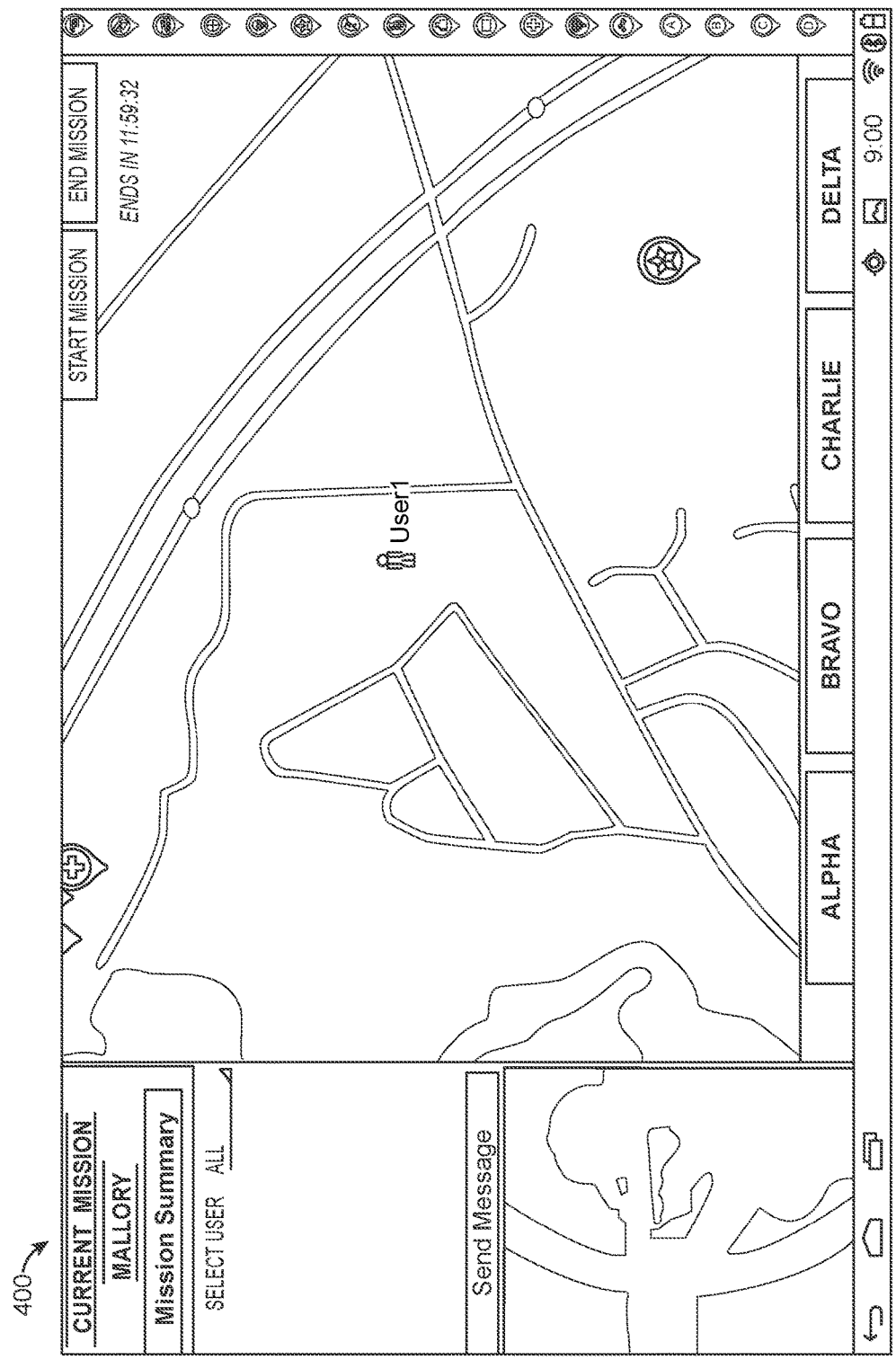
FIG. 4B shows a plurality of exemplary event objects that may be included in the module and used by an admin-user to affect play of the simulated mission, in accordance with an embodiment of the present disclosure.
Figure 4B:
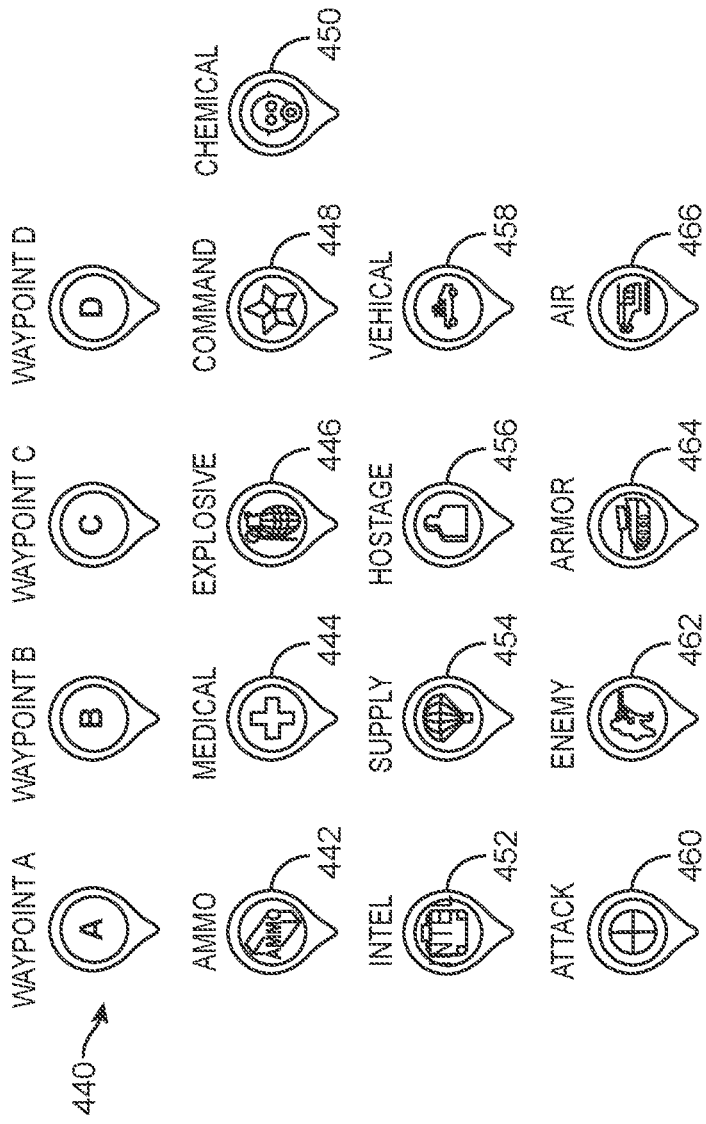

FIG. 4B shows a plurality of exemplary event objects that may be included in the module 418 and used by an admin-user to affect play of the simulated mission. As FIG. 4B shows, the system 100 may utilize one or more waypoints 440. Event object types can include any number of: an ammo supply 442, medical supply 444, an explosive device 446, a command station 448, a chemical hazard zone 450, an intelligence information 452, a supply 454, a hostage 456, a vehicle 458, an attack zone 460, an enemy 462, armor 464, and a zone associated with air defense or air offense 466. In one embodiment, an admin-user may place, drag, or otherwise selectively associate an area on the map with a selected event object. The event objects each correspond to pre-defined game play rules and operation associated with the respective event object types.

Figure 4C:
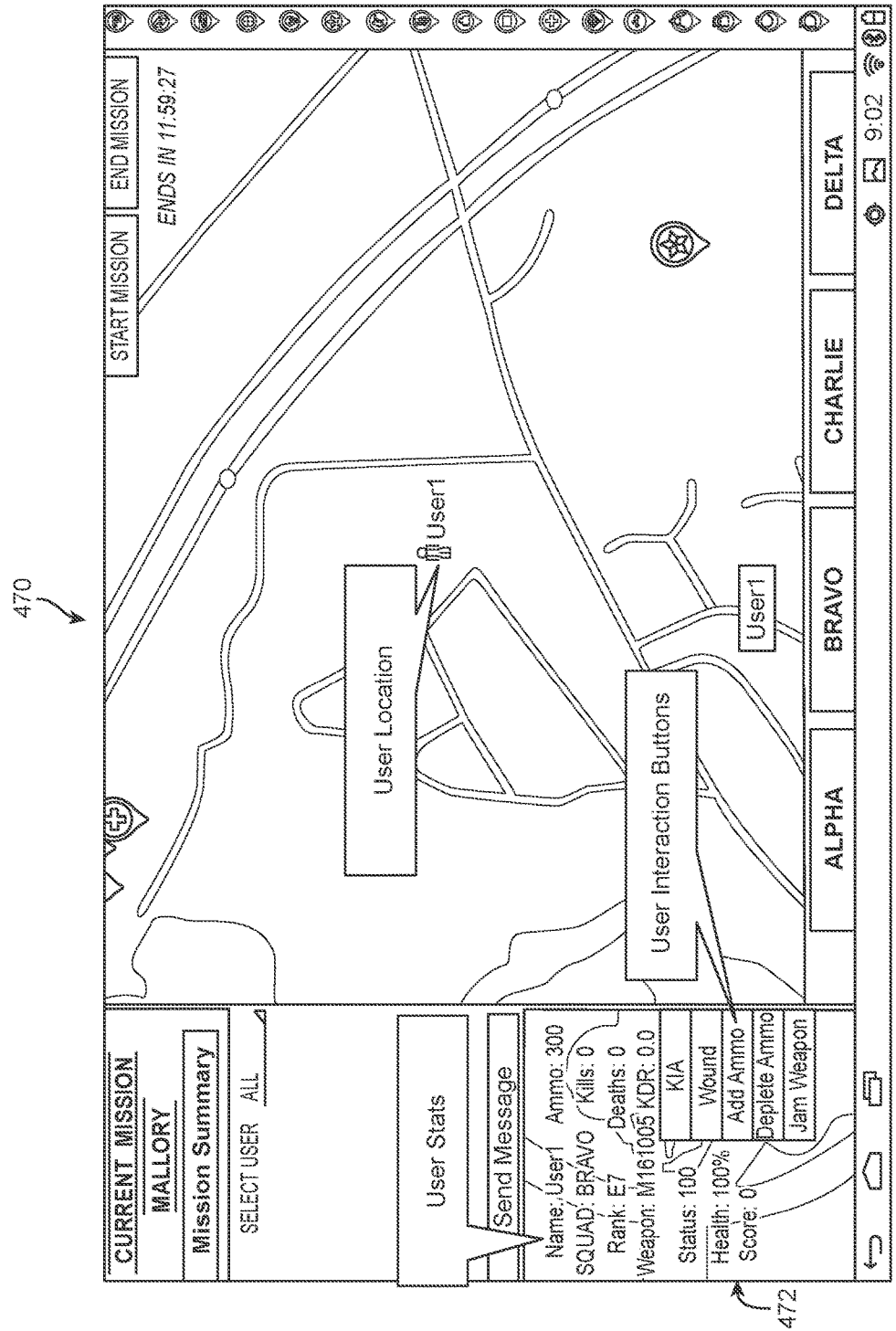
FIG. 4C shows another exemplary user interface illustrating control and display of player metrics and operating states, in accordance with an embodiment of the present disclosure.

FIG. 4C shows another exemplary user interface 470 illustrating control and display of player metrics and operating states. As FIG. 4C shows, information associated with a player-user may be displayed to an admin-user in a display module 472. Information can include one or more of the following: (1) name; (2) ammo available; (3) combat squad; (4) kills; (5) rank; (6) deaths; (7) weapon; (8) KDR; (9) Status; (10) health metric; and (11) performance metric. In one embodiment, control buttons may be displayed to the admin-user, such as one or more of the following: (1) a player termination button 474; (2) wound 476; (3) increase ammunition 478; (4) reduce ammunition 480; and (5) jam weapon.

In one embodiment of a simulated mission play, when a predetermined mission time runs out or a predetermined score limit is reached, the simulated mission will end. Upon reaching the mission end a message can be automatically generated and sent to every user in the mission, notifying them of the simulated mission status, e.g., the mission has ended. In one embodiment, the admin-user can end the simulated mission at any time.

In one embodiment, the interface 400 includes one or more navigational links to further administration interfaces such as navigational button 416. In one embodiment, actuation or selection of button 416 navigates the admin-user to a mission summary interface 420 shown in FIG. 5.

As FIG. 5 shows, data associated with a current or selected simulated mission may be displayed to an admin-user. In one embodiment, one or more data types may be selected by the admin-user to sort associated data. For example, in one embodiment, the admin-user may sort data by one or more of: (1) squad; (2) player name; and (3) player status, by actuating control buttons 422, 424, and 426, respectively. In one embodiment, the interface 420 includes one or more navigational links to further administration interfaces such as navigational button 428. In one embodiment, actuation or selection of button 428 returns the admin-user to the interface 400 shown in FIG. 4. In one embodiment, the interface 420 is configured to transmit messages to a selected player. In one embodiment, the interface 420 is configured to transmit a message to a selected combat squad. In one embodiment, the interface 420 is configured to transmit a message to all players.

Figure 6:
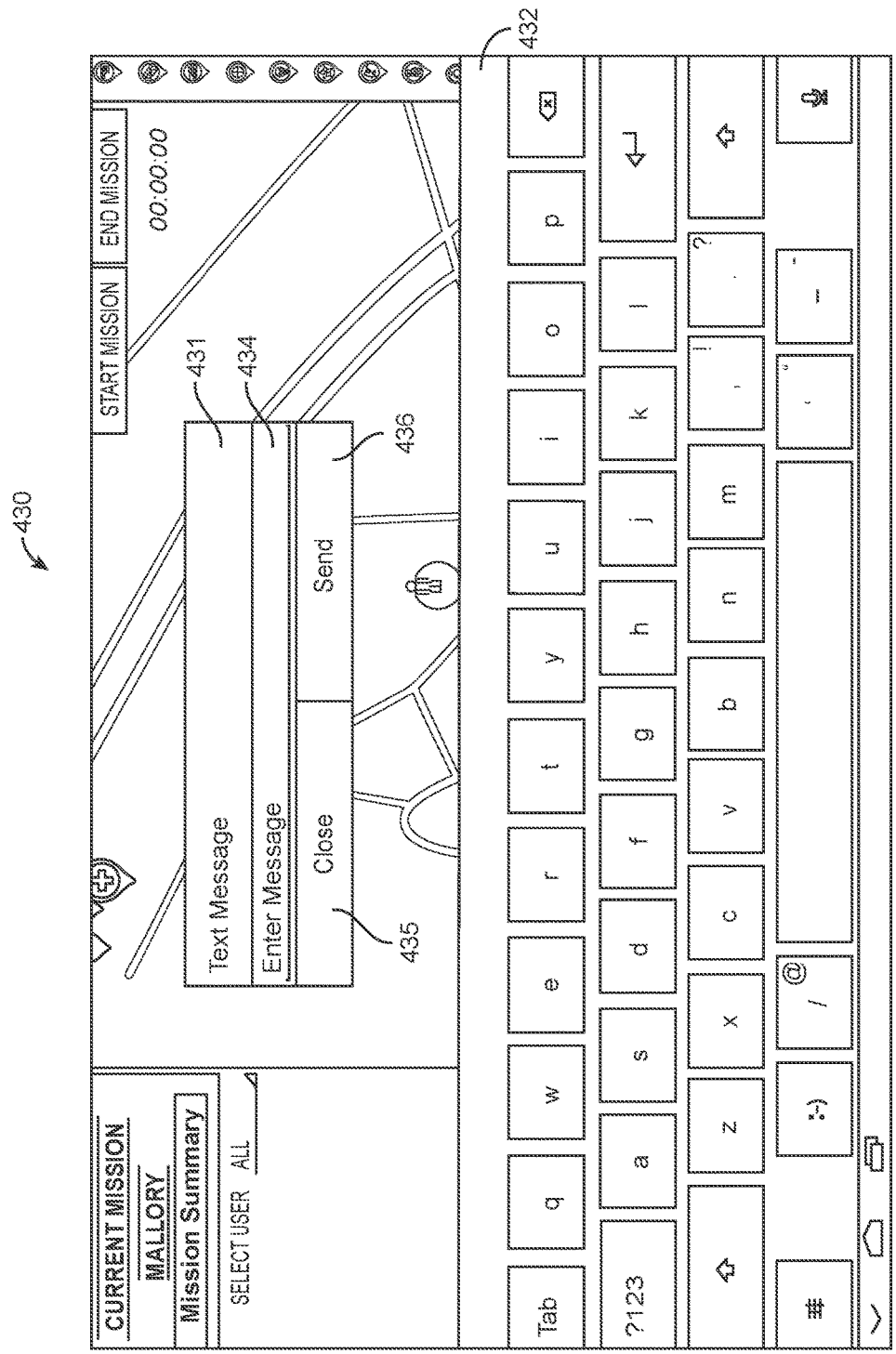
FIG. 6 shows an exemplary messaging interface configured for a mobile device, in accordance with an embodiment of the present disclosure.

FIG. 6 shows an exemplary messaging interface 430 configured for a mobile device. As FIG. 6 shows, the messaging interface 430 may be displayed to the admin-user as one or more pop-up windows. In one embodiment, the interface 400 or 420 may be transparently displayed in a background. The messaging interface enables an admin-user to enter or select a user, group of users, e.g., combat squad, or all users. In one embodiment, a first popup window 431 includes a messaging field 434 and control buttons, e.g., a message send control button 436. A second popup window 432 includes a keyboard so that the admin-user may selectively actuate alphanumeric characters to construct a message in a message field 434. In one embodiment, the popup window 432 is adapted to display and receive inputs from the mobile device 6. The admin-user may send the message by selecting control button 436. In one embodiment, an admin-user may navigate away from the interface 430 to a previous interface screen by actuating a position on the screen exclusive of the popup windows 431 and 432 or via actuation of control button 435.

Figure 7:
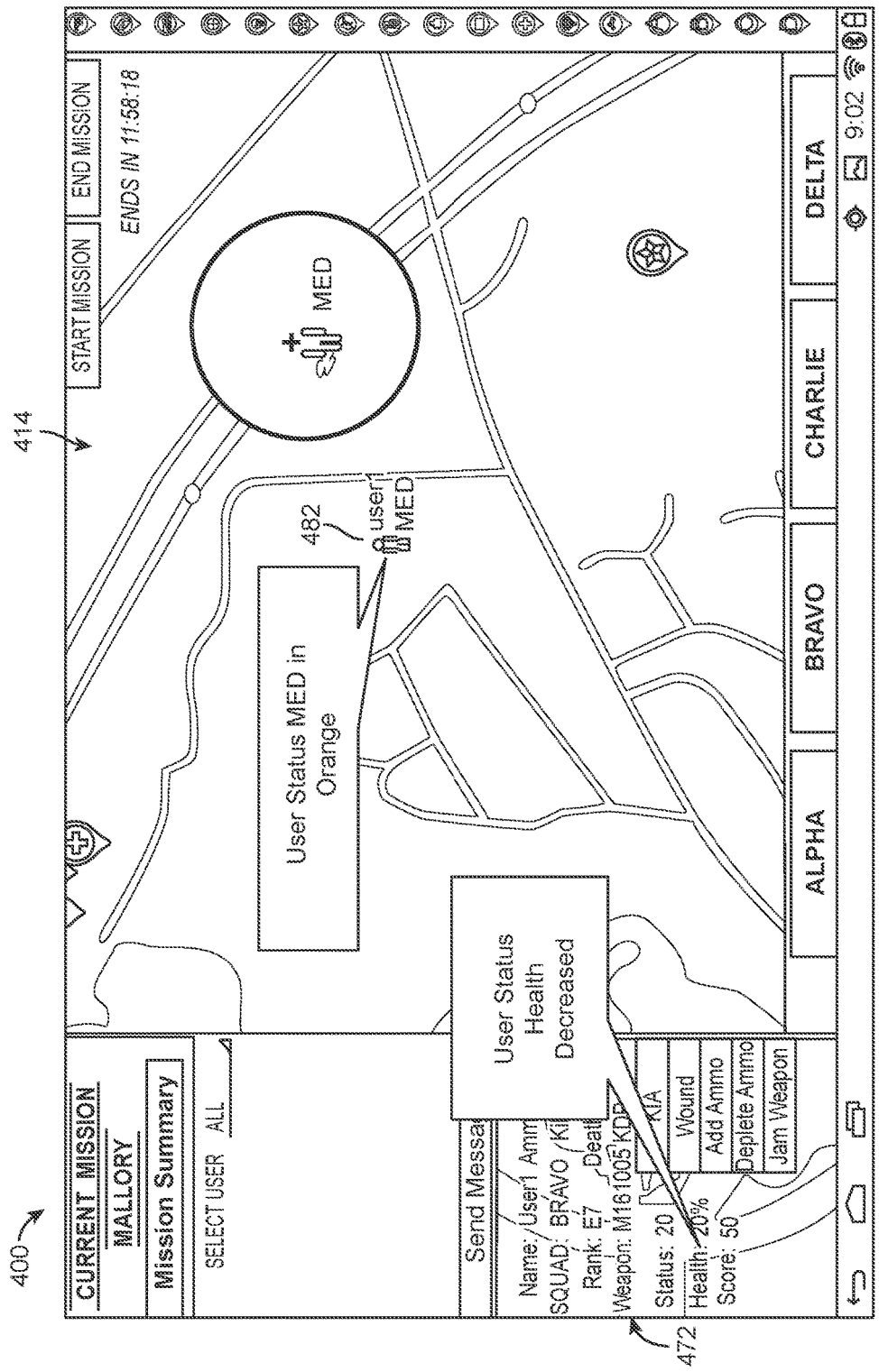
FIG. 7 shows an embodiment of the interface illustrating a player-user, in accordance with an embodiment of the present disclosure.

FIG. 7 shows an embodiment of the interface 400 illustrating a player-user. As FIG. 7 shows, an icon 482 associated with a player-user is displayed on the map area 414. In one embodiment, the icon may indicate a health metric or health status associated with the player. The health metric may be shown as a bar or area colored or graphed in, in a quantity indicative of the health metric. In one embodiment, the icon 482 may be colored to indicate health status. For example, green may indicate an excellent health status, while yellow and red indicate depleted and critical statuses, respectively. FIG. 7 further shows, that a selected player-user's information may be displayed in the display module 472 including the health status.

Figure 8:
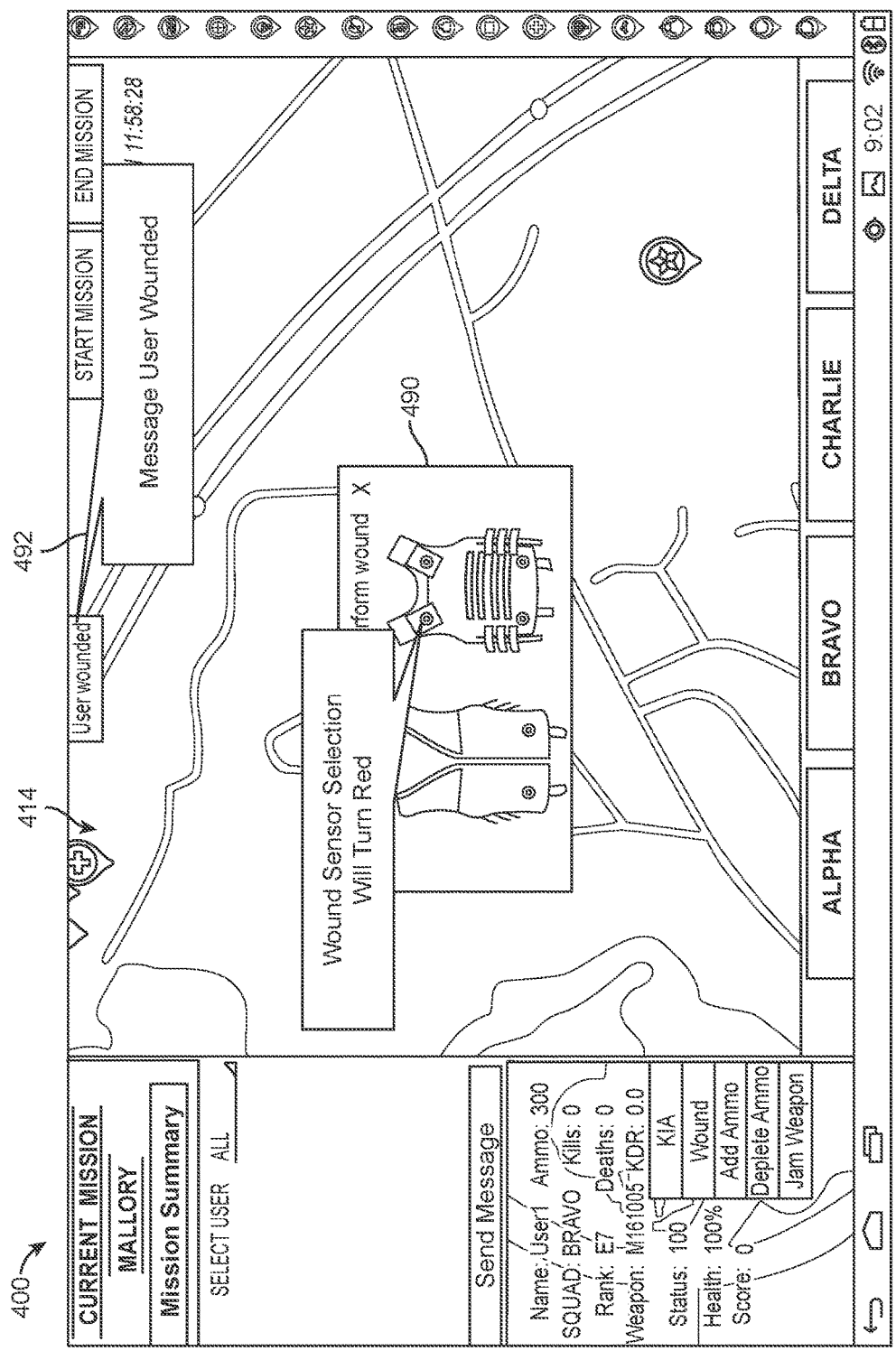
FIG. 8 shows an embodiment of the interface illustrating functions associated with the vest 12, in accordance with an embodiment of the present disclosure.

FIG. 8 shows an embodiment of the interface 400 illustrating functions associated with the vest 12. As FIG. 8 shows, in one embodiment, the admin-user may selectively execute a popup window 490 displaying a vest associated with a selected player-user. The vest associated with the player-user includes a plurality of sensors, as described herein above, that may be triggered manually by the admin-user or through a 'shot' of another player-user's weapon. Actuated sensors may be indicated in the popup window 490 visually though, e.g., highlighting. In one embodiment, the admin-user by selectively actuate or unactuate a selected sensor within the popup window 490. In one embodiment, the map view is configured to display real-time status updates via popup messages to the admin-user. One exemplary popup message 492 in FIG. 8 shows that a player-user was been wounded.

Figure 9:
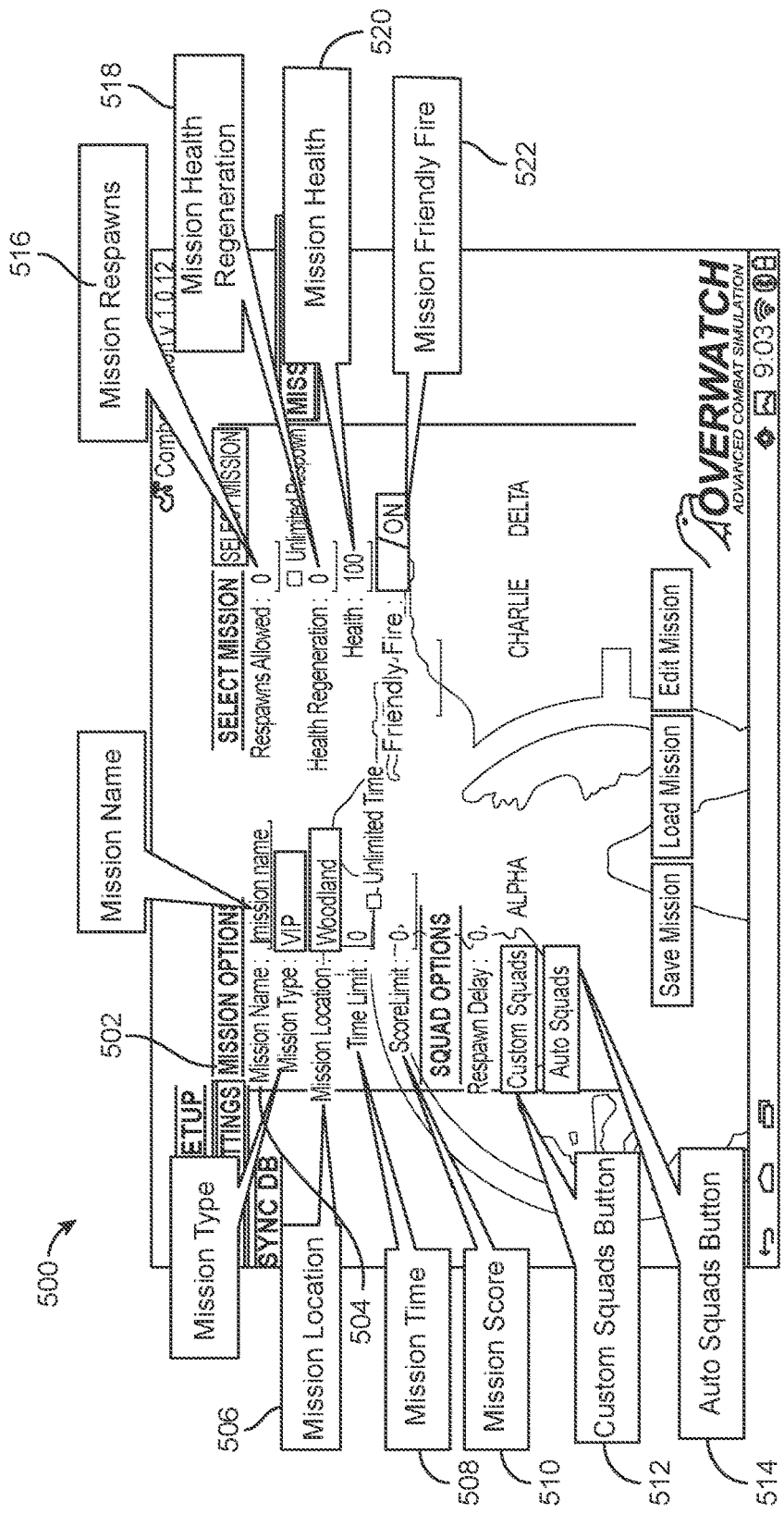
FIG. 9 shows an exemplary interface for controlling, setting, and displaying parameters of a mission, in accordance with an embodiment of the present disclosure.

FIG. 9 shows an exemplary interface 500 for controlling, setting, and displaying parameters of a mission. As FIG. 9 shows, an admin-user may set numerous mission parameters. In one embodiment, an admin-user may provide a mission name 502. In one embodiment, a mission type 504 may be selected from a list 504 of predefined mission types. Mission types can include one or more of the following: (1) a combat squad death match; (2) hostage rescue; (3) a VIP escort; (4) defend or capture intelligence; (5) free for all death match; and (6) capture the flag. In one embodiment, a mission location 506 may be set from a list of predefined location types. For example, a location type may be one of: (1) desert; (2) woodland; and (3) urban. In one embodiment, a mission time limit may be set 508. In one embodiment, a mission score limit may be set 510. In one embodiment, number of combat squads may be provided 512. In one embodiment, assignment protocol of members to the combat squads may be set 514, e.g., manually or randomly assigned. In one embodiment, a number of allowable respawns may be set 516. Respawns are virtual lives, e.g., after virtually expiring you may be respawned, granting you another life. In one embodiment, a health regeneration time may be set 518. In one embodiment, a global health metric may be set 520. In one embodiment, the admin-user may specify whether shots from same members of a combat squad may qualify for wounds, i.e., friendly fire 522.

The admin user may place, when setting a mission, event objects within a field of play via a map view. In one embodiment, a command station 448 is used by an associated combat squad as a starting point. In one embodiment, the medical supply 444 permits player-users to have a respawn or medical supply area. In one embodiment, the ammo supply 442 allows player-users to have an ammo increase.

Figure 10:
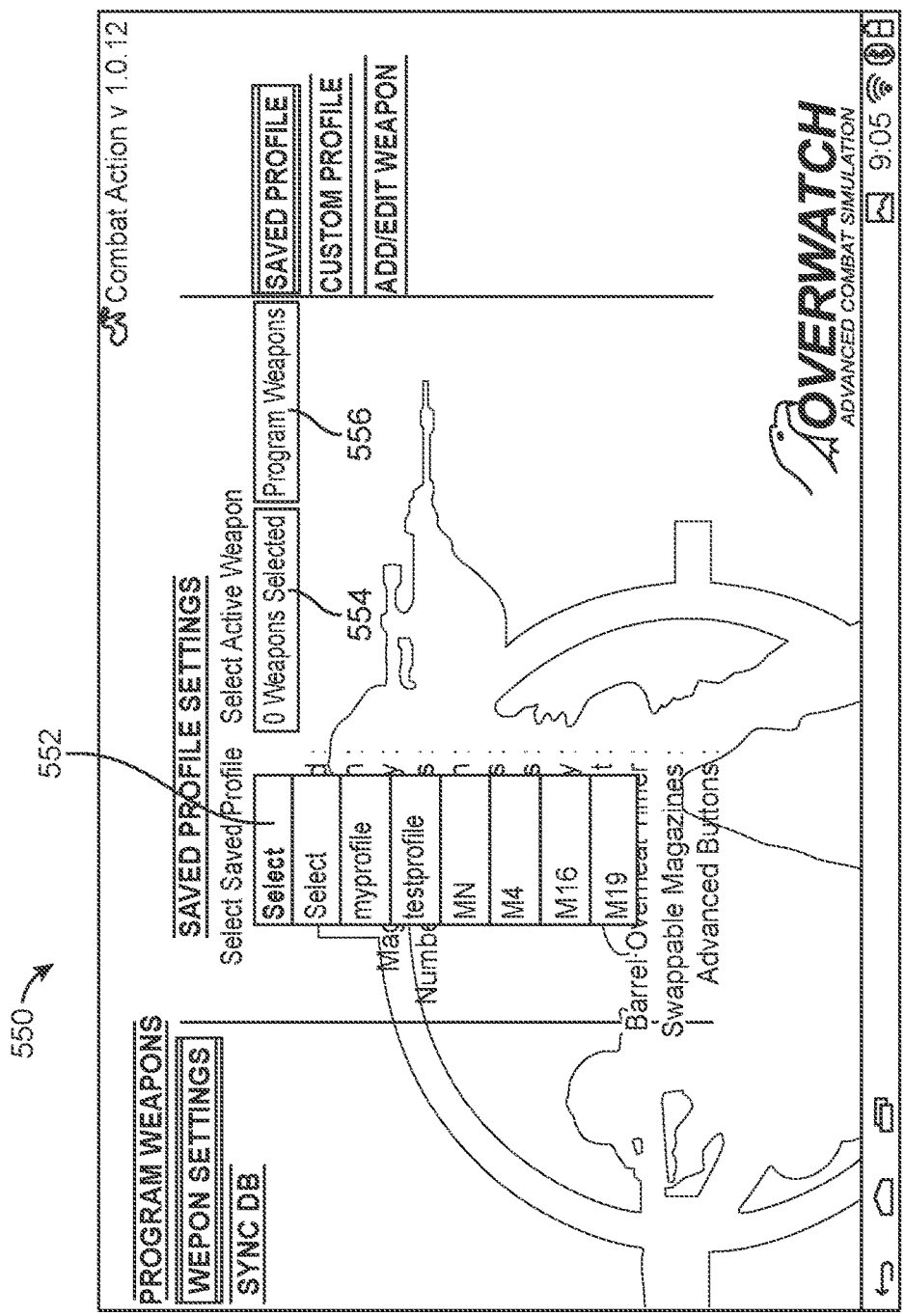
FIG. 10 shows an exemplary interface for activating weapons for use during a mission, associating a weapon with a combat squad or selected player-user, and for setting operating parameters of a weapon, in accordance with an embodiment of the present disclosure.

FIG. 10 shows an exemplary interface 550 for activating weapons for use during a mission, associating a weapon with a combat squad or selected player-user, and for setting operating parameters of a weapon. The operating parameters may be stored as a weapons profile 552. In one embodiment, weapons must be activated for use in a mission 554. In one embodiment, a program operating parameters navigational button is available 556. The button 556 moves the admin-user to an interface configured for defining operating parameters of a selected weapon profile.

Figure 11:
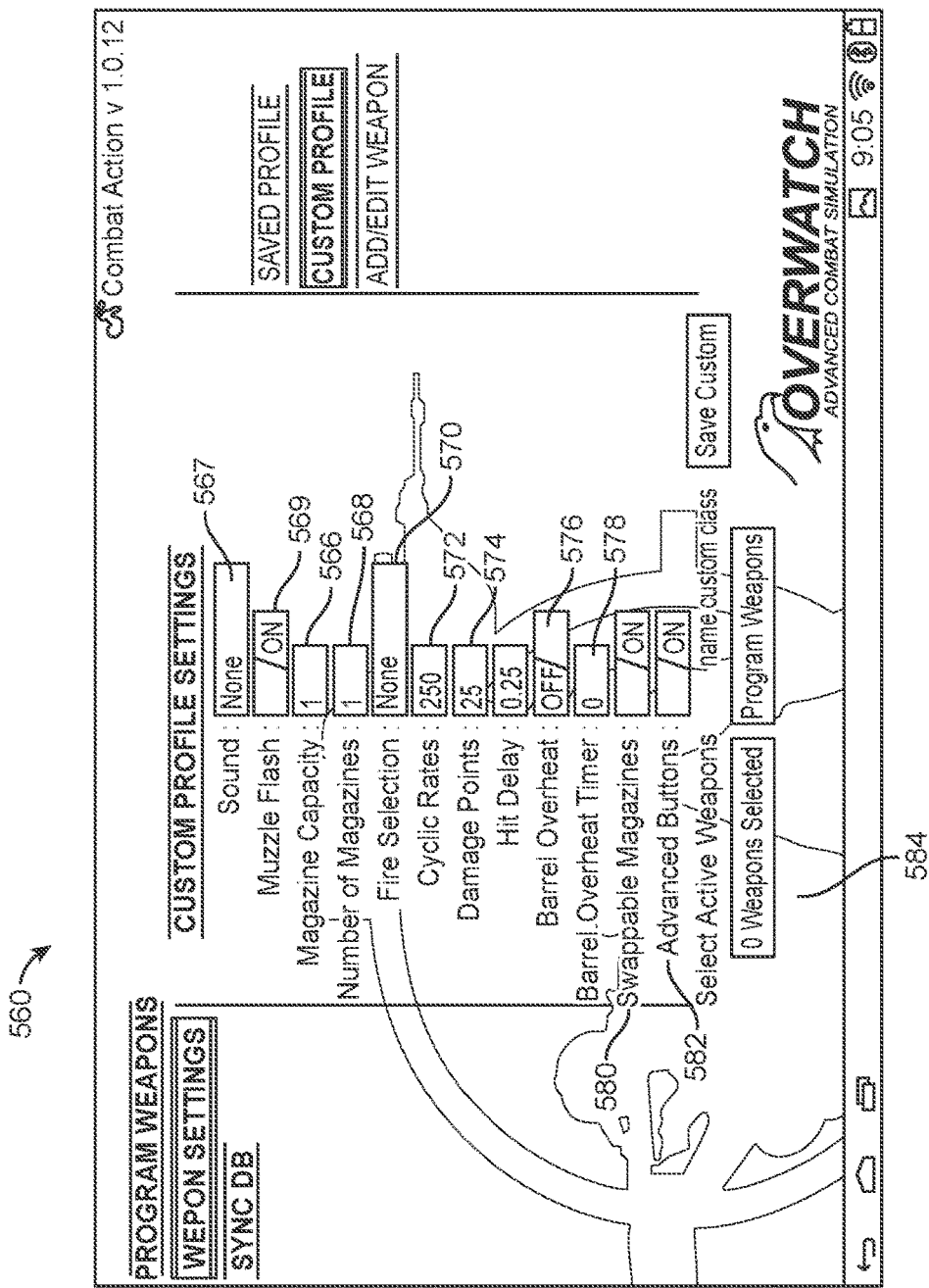
FIG. 11 shows an exemplary interface for defining operating parameters of a selected weapon, in accordance with an embodiment of the present disclosure.

FIG. 11 shows an exemplary interface 560 for defining operating parameters of a selected weapon. In one embodiment, an admin-user may set a sound associated with a trigger actuation of the weapon 562. In one embodiment, an admin-user may set a muzzle flash parameter 564. In one embodiment, the muzzle flash parameter will emit a light corresponding to a color associated with the combat team associated with the player-user and the weapon. In one embodiment, the admin-user can set a magazine capacity of the weapon 566. In one embodiment, the admin-user can set a limit on the number of magazines in a supply for a player-user 568.

In one embodiment, the admin-user can set a fire selection parameter 570. The fire selection parameter controls the firing characteristics of the weapon 10. In one embodiment, the fire selection parameter may be set to a semi-automatic operating state. In one embodiment, the fire selection parameter may be set to a predetermined quantity of rounds fired per trigger actuation. For example, a three round "burst." In one embodiment, the selection parameter may be set to fully automatic operating state, wherein a trigger actuation of the weapon 10 results in continuous firing while actuated.

In one embodiment, the admin-user may set a cyclic rate 572 corresponding to a rate of rounds fired when the fire selection parameter is set to 'automatic'. In one embodiment, the admin-user may set a damage points parameter corresponding to a metric of damage that a successful shot will inflict on an enemy combatant 574. In one embodiment, the admin-user may set a hit delay parameter 576 corresponding to a time delay when a player-user is hit by the combatant, simulating a flinch that a person would feel if they were hit in a real-world scenario. In one embodiment, the admin-user may set a barrel overheat parameter 576. The barrel overheat parameter may be ON or OFF. In one embodiment, the admin-user may set a barrel overheat timer 578. When in the ON operating state, a weapon may overheat when fired a predefined quantity for a predefined time period, the barrel overheat parameter sets a time limit a player-user must wait before able to fire the weapon 10 again.

In one embodiment, the admin-user may set a swappable magazine parameter 580 to an ON operating state or an OFF operating state. When in the ON operating state, the player-user may swap magazines to reload. When in the OFF operating state, the player-user may simply use a single magazine for a mission. In one embodiment, the admin-user may select an advanced buttons feature 582 corresponding to weapon specific features. In one embodiment, the admin-user may select one or more weapons to associate with the custom profile 584.

FIGS. 12A-H show exemplary interfaces for use by a player-user.

FIG. 12A shows an embodiment of the interface 600 having a login and password fields 602 and 604, respectively. The player-user may log into the system via the 'submit' button 606. In one embodiment, a registration module and a login information module are displayed upon selection.

FIG. 12B shows an embodiment of the interface 600 having a weapons selection option 608. In operation, the player-user may select a weapon from a drop down list, the list corresponding to weapons made available by the admin-user for the mission. Upon selection of the weapon, the player-user may select the 'next' actuation button 610. In one embodiment, information associated with the selected weapon may be displayed to the player-user within a module 612 of the interface 600, e.g., weapon type, rounds available, magazines available, etc.

FIG. 12C shows an embodiment of the interface 600 having a player informational module 614 for displaying player information including statistics, metrics, and status. As FIG. 12C shows, the information module may include a player name, rank, combat squad name, members of the combat squad, kills, deaths, KDR, rounds made available, wins, losses, score, health status, coordinates of a physical location (e.g., GPS coordinates), ammo reserves, and a health status. In one embodiment, the information module 614 may include graphical icons that are associated with event objects interacted with by the player-user.

Figure 12F:
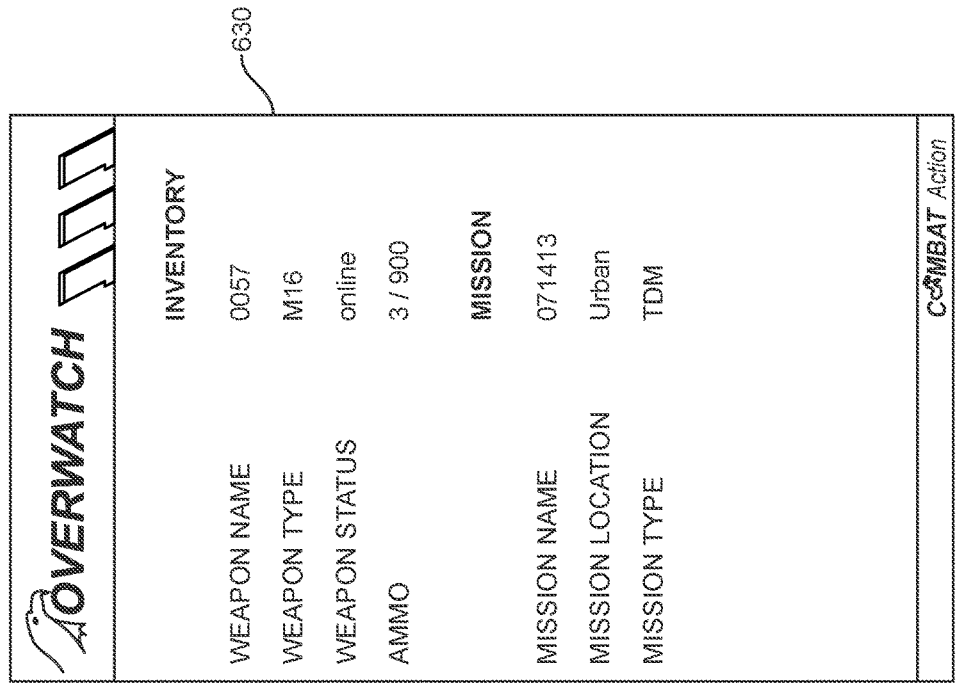

In one embodiment, a navigational button 616 is available and configured to navigate a player-user to a messaging module 622 when actuated such as illustrated in exemplary FIG. 12D. In one embodiment, a navigational button 618 is available and configured to navigate to a mapping module 628 when actuated such as illustrated in exemplary FIG. 12E. In one embodiment, a navigational button 620 is available and configured to navigate to an inventory display module 630 when actuated such as illustrated in exemplary FIG. 12F.

In one embodiment, each player or squad may be assigned or have the ability to hear perks for use during the simulated combat mission. Perks may be utilized by a player against an opponent. For example, a player or squad may have the ability to call in an airstrike, fire a mortor, and/or deploy a drone for reconnaissance. In one embodiment, a quantity of the perks may be controlled by the admin-user. In one embodiment, a duration for the perk, if applicable, may be controlled by the admin-user. For example, a deployed drone may have a predefined time period for collection information, e.g., opponent position.

Referring to FIG. 12D, in one embodiment, the messaging module 622 can include a drop down list 626 having one or more users, groups, or everyone. A message field 624 is included for typing a message. The messaging module may be configured to display prior messages to a selected group, player-user, of everyone upon selection of an item listed in the list 626.

Figure 12E:
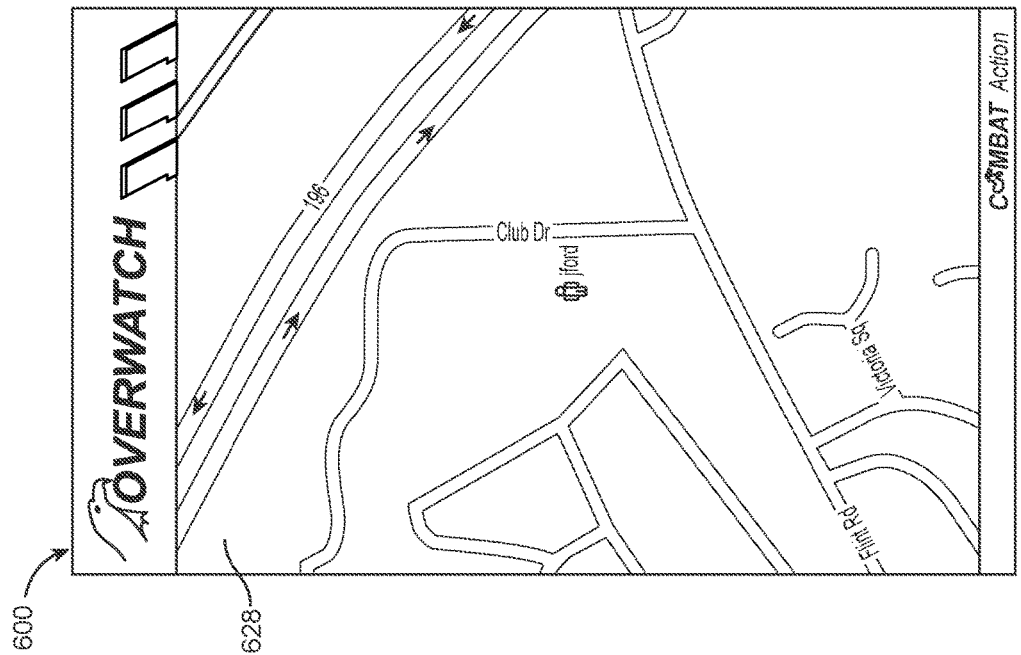
Figure 13A:
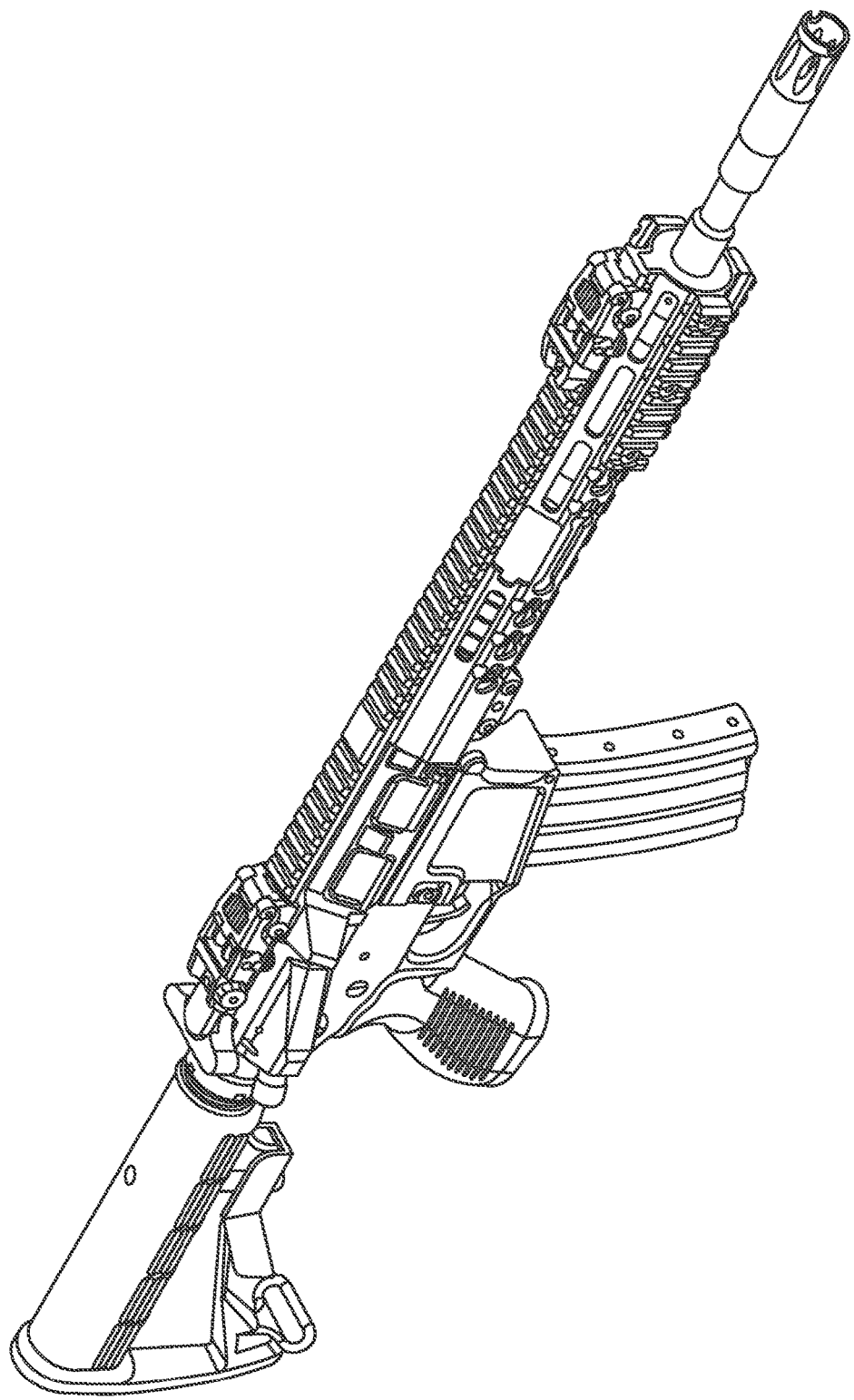
FIG. 13A is a perspective view of an exemplary weapon, in accordance with an embodiment of the present disclosure.
Figure 13B:
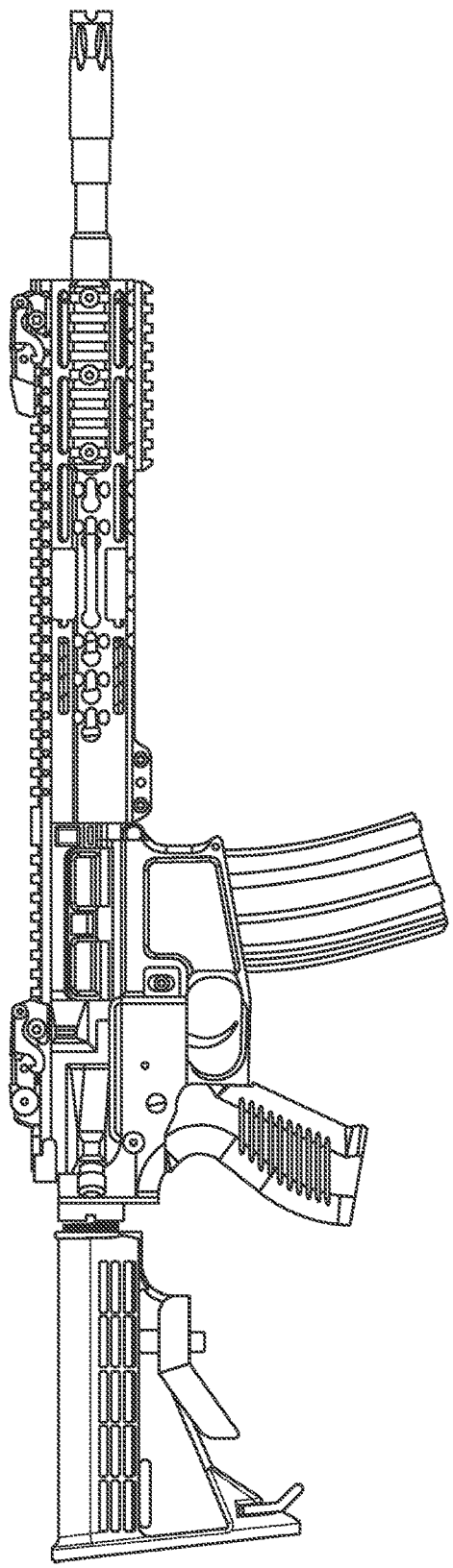
FIG. 13B is a front view of an exemplary weapon, in accordance with an embodiment of the present disclosure.
Figure 13C:
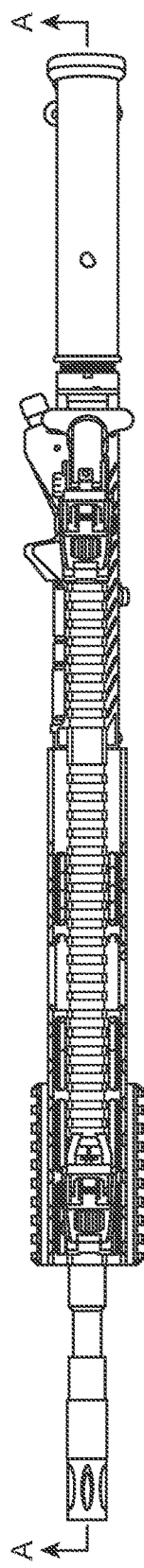
FIG. 13C is a top view of an exemplary weapon, in accordance with an embodiment of the present disclosure.
Figure 14:
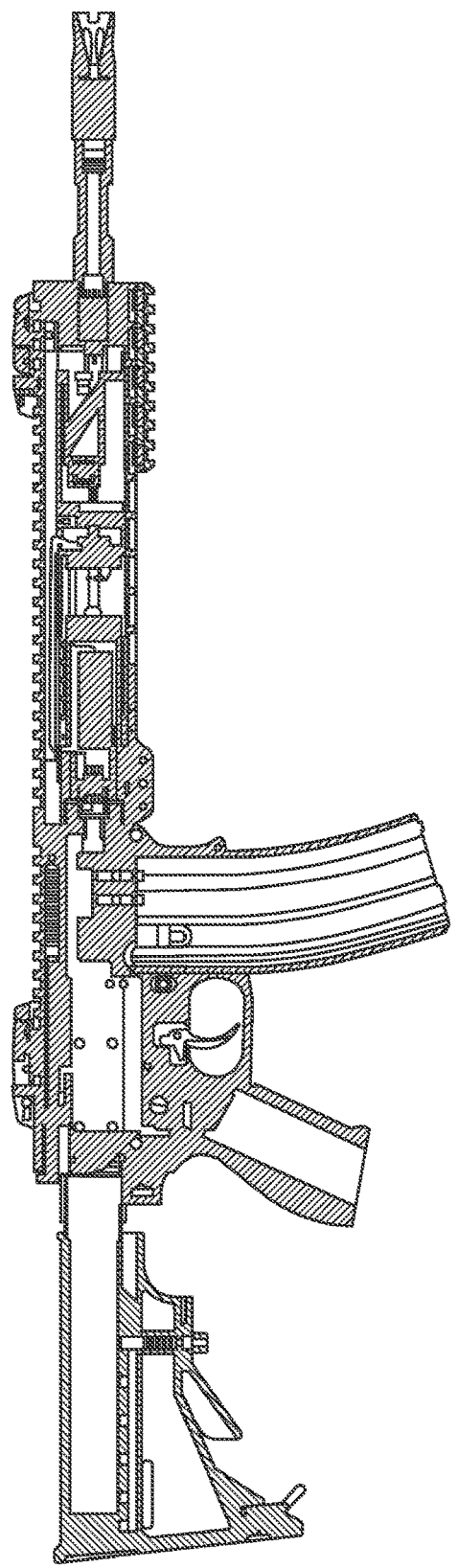
FIG. 14 is a cross-sectional view of the exemplary weapon viewed along line A-A of FIG. 13C, in accordance with an embodiment of the present disclosure.
Figure 15:
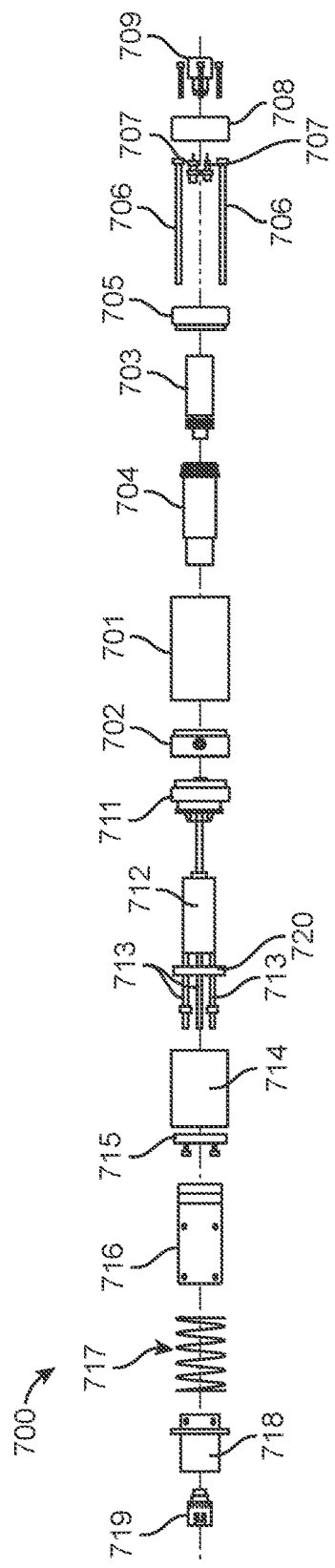
FIG. 15 is a partially exploded view of components of the weapon, in accordance with an embodiment of the present disclosure.
Figure 16C:
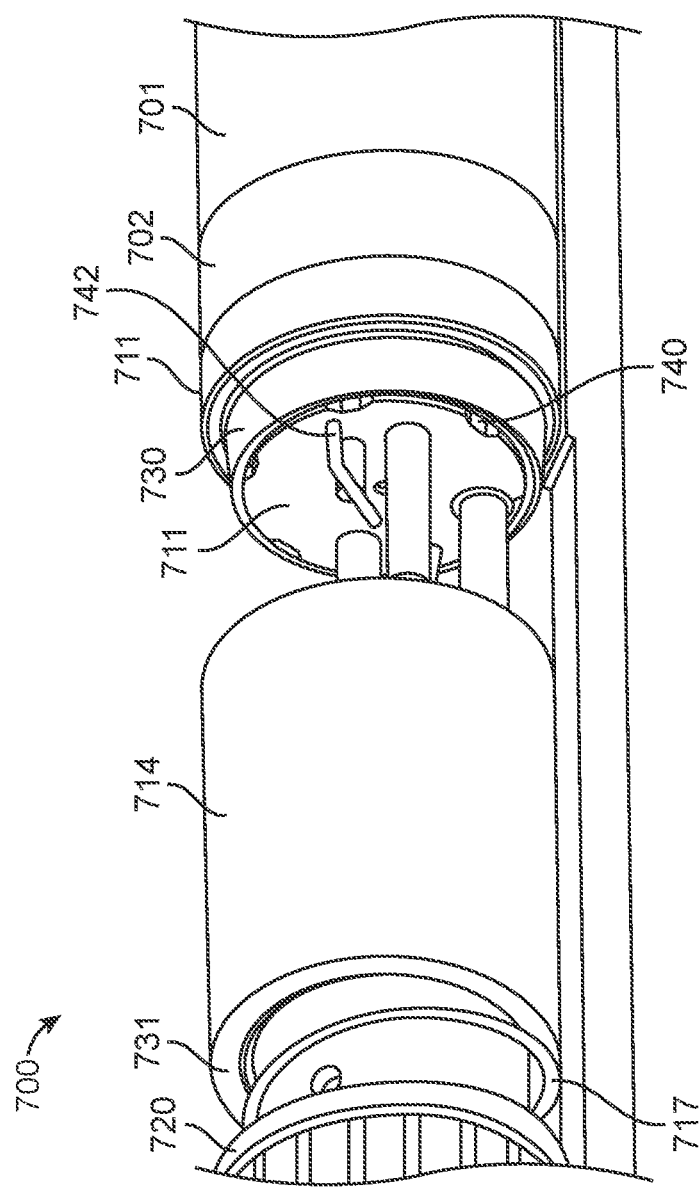
FIG. 16C is an enlarged view illustrating a noise generating system in a fired state illustrating components of the noise generating system, in accordance with an embodiment of the present disclosure.

Referring to FIG. 12E, in one embodiment, the mapping module 628 is configured to show a current location of the player-user. In one embodiment, the mapping module 628 may display known items to the player-user, e.g., a command center or visited locations, e.g., medical supply. In one embodiment, the mapping module 628 is configured to display a selected event object placed by the player-user. For example, in one embodiment, the player-user may indicate a place on the map by, for example, pressing the touch screen of the mobile device, upon pressing a location a list of informational event objects may presented to the player-user. In this way, the player-user may "drop" information on a location in the mapping module 628 for future reference or for reference by player-users within the combat squad. For example, one player-user may find hazardous chemical zone. By "dropping" the informational event object into the mapping module 628 other player-users may see the event object and avoid the area when engaging in the simulated combat mission.

Referring to FIG. 12F, in one embodiment, the inventory display module 630 displays information associated with a player-user's inventory and weapon. In one embodiment, the inventory display module 630 may include a weapon name, weapon type, weapon status, and available ammo. In one embodiment, mission information may be displayed including, for example, a mission name, mission location, and mission type.

Figures 12G, 12H:
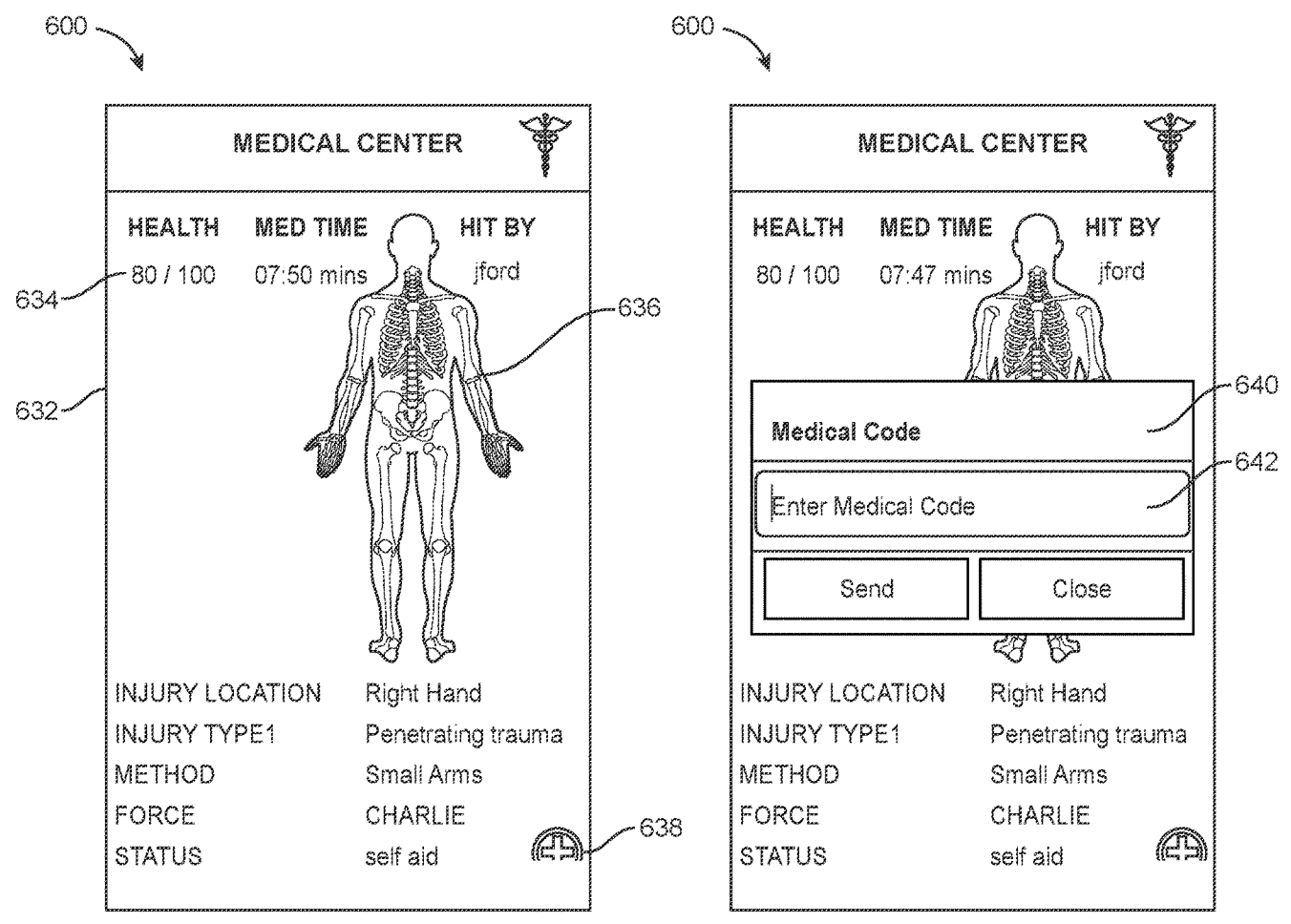

FIG. 12G shows an embodiment of the interface 600 having a medical health module 630 for displaying player health status and information. In one embodiment, the health module shows a current health metric 634 associated with the player's health in the simulated combat mission. In one embodiment, a graphical representation of a player's health metric may be displayed 636. In one embodiment, the graphical representation can show injured areas on a player's body. In one embodiment, injury information may be displayed such as injury location, injury type, cause or method of injury, combat squad inflicting the injury, and a status. In one embodiment, a navigational button 638 is available to the user to navigate to a medic code module 640 such as displayed in FIG. 12H.

Referring to FIG. 12H, in one embodiment, the medic code module 640 enables a player user to enter a code. The code can be an alphanumeric string. In one embodiment, upon entering a predetermined code with a field 642, the player-user's health metric increases corresponding to healing. In simulated combat play, a code can be physically placed within a combat zone associated with a medical supply event object. The player-user may then manually enter the code. In one embodiment, upon physically entering a zone associated with a medical supply event object, the code is automatically applied, increasing a player-user's health metric.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

FIGS. 13A-16C schematically shows an exemplary embodiment of the weapon 10 to illustrate an optional noise generation system 700. The noise generation system 700 may be made integral with a housing of the weapon 10, or contained therein. In one embodiment, the noise generation system 700 is housed in a body barrel of the weapon 10. In one embodiment, the system 700 is removably attached to the weapon 10. In one embodiment, combustible material is stored in reservoir or fuel tank 701. It is contemplated that most any form of combustible material may be used, including combustible gases such as propane and butane or a mixture of such gases.

The combustible gas may be stored under pressure in reservoir 701 and sealed with a front cap 702, preferably threadedly. Within the fuel tank 701, is a pressure regulator 703 which may be stored within a housing 704. In one embodiment of the invention, the regulator 703 sets or controls the gas pressure within the reservoir and/or the fuel exiting the reservoir 701. The fuel tank 701 is then capped with a rear fuel cap 705. Bolts 706 or other mechanical fastener may thread into mounting pillars 713, in one embodiment. Hose connections 707 may be connected to the front connector 709 and aid in gaseous or fluid communication of air and fuel. A front connector housing 708 may be utilized to hold portions of the noise generation system 700 in place including, e.g., the front connector 709.

A gas head 711 connects the reservoir 701 to the ignition controller 712. The ignition controller 712 may be a valve configured to selectively inject fuel into a combustion chamber or firing chamber sleeve 714. The valve may be a solenoid valve. A solenoid valve may be advantageous since it can be controlled by electric currents. However other types of valves may be used in other embodiments.

When assembled, the biasing member 717 is tensioned against a circular support element 720 and an edge 731 of the firing chamber sleeve 714. In this way, the biasing member 717, such as a spring, pushes the sleeve 714 against the gas head 711 during an idle state. The biasing member 717 may be utilized for mitigating recoil during a firing event. While against the gas head 711, a tapered O-ring 730 abuts an interior, annular surface 732 of the sleeve 714. The surface 732 may be tapered or may be machined to have a slightly larger radial surface than further within the sleeve 714. A second O-ring 734 is within a gap 736 of the sleeve 714. In one embodiment, a width of the gap 736 is at least double the diameter of the O-ring 734. In one embodiment, the gap has a depth of slightly less than the diameter of the O-ring 734. The circular support element 720 also functions as a rear seal, defining a wall of the firing chamber. A second seal 715 further supports the support element 720, when assembled. A housing 716 is preferably utilized to contain an ignition controller, which is communicably connected to the trigger.

The firing chamber is defined by the element 720, interior walls of the sleeve 714, and the gas head 711. The firing chamber includes an igniter 742 configured to selectively provide a spark. A plurality of openings 740 may be formed around a circumference of the gas head 711 that lead to the fuel tank. In this way, gas may be selectively provided into the firing chamber in a more homogenous manner.

FIG. 16A shows firing chamber in a closed, or idle position. The sleeve 714 is pushed against the gas head 711 and the firing chamber is substantially sealed from outside air. The O-ring 734 is pushed against a rear wall of the gap 736. Upon a firing event, which may be initiated via a trigger actuation, combustion of the gas within the firing chamber increases pressure, which affects the shape of the O-ring 730, flexing it upward and back to the gas head 711. This loosens the friction against the sleeve 714, which permits evacuating gas to force the sleeve 714 toward the support element 720. The O-ring 734 is initially not a drag on movement of the sleeve 714 toward the support element 720, but once the distance between the O-ring 734 and the forward wall of the gap 736 is traversed, the O-ring 734 will provide friction to slow the sleeve 714.

FIG. 16B shows the firing chamber in an open position, before the biasing member 717 has returned the sleeve 714 to the closed position during the firing event. As FIG. 16B shows, the O-ring 734 is pressed against the forward wall of the gap 736.

In one embodiment, the noise generation system 700 includes a spark module for initiating combustion of the combustible material in chamber 714. The spark module may be connected to spark probes 742 shown in FIG. 16C, which extend outwards into the chamber generally in front of a valve. The spark module may be configured to generate sparks across the spark probes selectively in response to user actuation via the trigger.

In operation, the noise generation system 700 simulates the noise of a conventional firearm. A noise generation system 700 comprises a housing defining a chamber in which one or more of the chamber walls are moveable between a first position in which the chamber is fluidly sealed and a second position in which the chamber is open to the external, ambient atmosphere. Combustible material is injected into the sealed chamber and combustion of the combustible material is triggered by a spark. This generates an explosion which generates a gun-like noise. Contemporaneously, the moveable wall of the chamber is opened to allow exhaust material to exit the chamber.

Following the combustion of material, fresh air flows into the open chamber. The moveable wall then moves back into place to re-seal the chamber ready for more combustible material to be injected for the next 'firing' of the device (i.e. noise generating process).

Figure 17A:
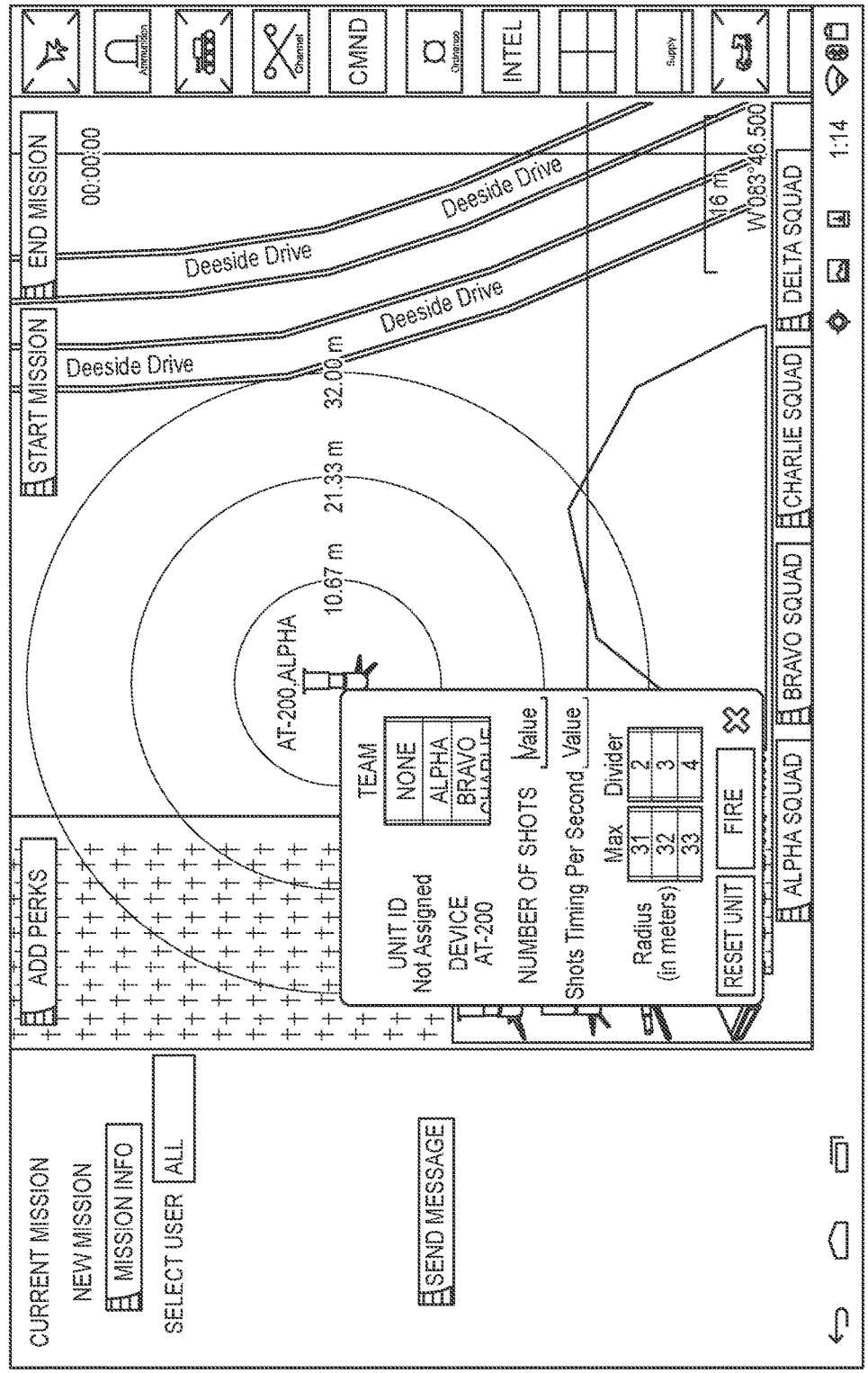
FIGS. 17A-B show exemplary interfaces for use by a player-user.
Figure 17B:
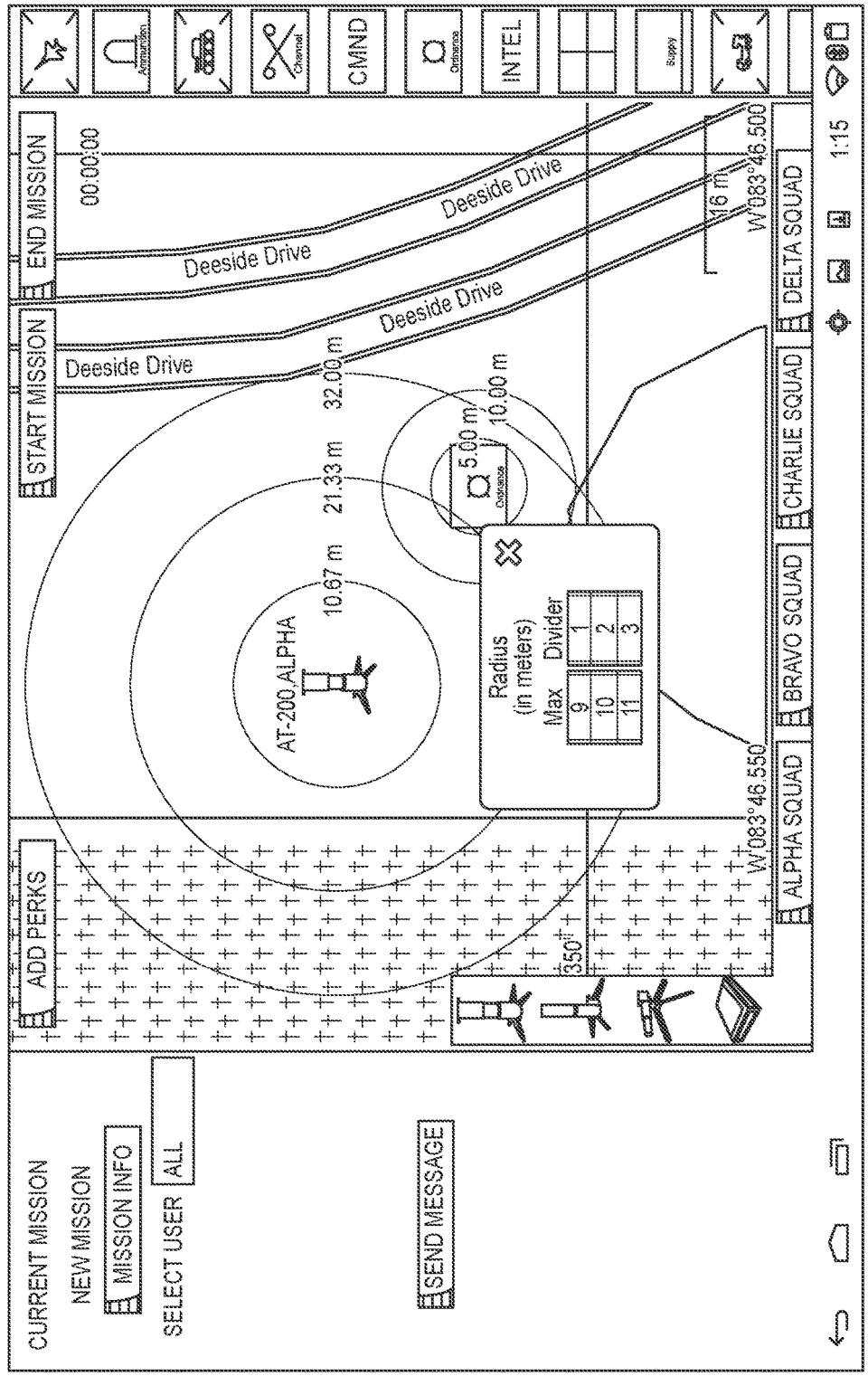

FIGS. 17A-B show exemplary interfaces for use by a player-user.

FIGS. 17A and 14B illustrates an exemplary interface having a virtual improvised explosive device ("TED") mapped to a geographical location. In one embodiment, the TED is associated with a particular team deploying the weapon. A maximum blast distance may be set. A divider metric may be set, whereby blast damage may be configured according to distance away from the IED. The greater the divider number, the less percentage damage the IED does at a particular distance and vice versa. For example, a 100-meter maximum with a divider of 5 would equal 20 rings around the IED. Each ring is associated with a different percentage of heath removed so the closer you are the more health that will be remove, e.g., on a 20-ring simulation the 5 most outer rings will remove 10% health, the next 5 rings in will remove 30% health, the next 5 will remove 50% health, and the closest 5 rings will remove 90%-100% of health causing a sever wound or death. A number of shots and shots timing per second may be set as well.

FIG. 17B illustrates an ordinance device that may operate similarly to the IED. In one embodiment, a maximum blast distance may be set along with a divider metric. In this way, an ordinance may be virtually deployed with a set health damage corresponding to distance from the ordinance. In one embodiment, actuation events cause players to loss health metrics based upon their location in proximity to the ordinance and/or IED.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. A combat simulation system comprising:
a plurality of simulation weapons each having a trigger configured to simultaneous control emission of a light beam and initiate a combustion event to generate noise and provide kickback, wherein the combustion event comprises:
simultaneously: (1) injecting fuel into the combustion chamber; (2) initiating a spark event; and (3) initiating emission of a light beam as part of a combat simulation;
a plurality of wearable sensors configured to detect signals from the weapons;
a plurality of user devices each configured to determine a user's location; and
an administration computing device comprising a tangible computer-readable medium storing program code segments, the program code segments configured to cause a processor to perform a method, the method comprising:
administering a simulated mission;
deploying virtual weapons having blast events defined by a maximum blast radius and a plurality of rings, wherein each ring is associated with a definable health metric loss applicable against one or more players located within the ring;
monitoring user locations, user operating parameters, and status of mission objectives during a simulated mission; and
enabling dynamic control of the simulated mission including user operating parameters, simulated event objects, and mission parameters associated with the simulated mission; and
displaying a plurality of graphical images indicative of information and parameters associated with the simulated mission including the monitored user locations.

2. The system of claim 1, wherein administering the simulated mission comprises:
associating one or more users with a group;
associating the users with the simulated mission;
associating initial mission parameters of the simulated mission based upon a selected mission type; and
associating a weapon profile with a selected simulation weapon for a selected user.

3. The system of claim 2, wherein the initial mission parameters comprises a mission completion duration and a parameter associated with randomly partially disabling a randomly selected user's simulation weapon.

4. The system of claim 2, wherein the weapon profile defines operating parameters of the simulation weapon for the selected user, wherein the operating parameters include at least one of a muzzle flash parameter, a magazine capacity, a firing characteristic parameter, a firing distance parameter, a damage points parameter, a hit delay parameter, a swappable magazine parameter, and a barrel overheat parameter.

5. The system of claim 1, wherein the displaying further comprises an interface configured to selectively: (1) zoom in and out on a map view module; (2) adjust parameters associated with a selected simulated event object; (3) add mission event objects; (4) view player locations; (5) view player statistics and player operating metrics (6) view mission statistics and mission operating metrics; (7) adjust ammo on a selected player's weapon; and (8) partially disable a selected player's weapon.

6. The system of claim 5, further comprising: enabling use of a user's simulation weapon after partially disablement upon receiving notification that a user has performed a sequence comprising: (1) slapping a magazine of the simulated weapon upward; (2) pulling a charging handle of the simulated weapon in a rearward direction; (3) releasing the charging handle; and (4) tapping a forward assist assembly of the simulated weapon.

7. The system of claim 1, wherein the administration computing device is configured to display a user interface, wherein the user interface is configured to associate a selected event object with a particular location when a user drags the selected event object to a map view module within the user interface.

8. The system of claim 1, wherein the simulated event objects are associated with predefined operating rules during the simulated mission corresponding to a simulated event object type.

9. The system of claim 8, wherein the simulated event object types are one of a waypoint, a weapons depot, an ammo reload area, a supply area, and a medical area.

10. The system of claim 8, wherein the simulated event object types are one of an ammo supply, a medical supply, an explosive device, a command station, a chemical hazard zone, an intelligence information, a supply, a hostage, a vehicle, an attack zone, an enemy, armor, and a zone associated with air defense or air offense.

11. The system of claim 8, wherein one or more of the simulated event object types are associated with a geographical location.

12. The system of claim 1, wherein dynamic control of simulated event objects comprises:
selectively generating simulated event objects;
selectively moving the simulated event objects to a selected location; and
selectively associated an area with a simulated event object.

13. The system of claim 1, wherein dynamic control of the user operating parameters comprises:
selectively, partially disable a selected player's weapon;
selectively terminating a selected user;
selectively wounding a selected user; and
selectively adjusting ammunition quantity for a selected user.

14. The system of claim 1, wherein the administration computing device is configured to display a user interface configured to selectively display a health metric associated with a selected user, and wherein the health metric is determined based upon actuations of a user's wearable sensors.

15. The system of claim 1, wherein dynamic control of the user operating parameters comprises selectively wounding a selected user by selectively actuating one or more of the plurality of wearable sensors remotely.

16. The system of claim 1, wherein the blast event causes a loss of a player's health metric based upon the player's location with respect to the deployed virtual weapon.

17. The system of claim 16, wherein the blast event causes a greater loss of a player's health metric as the player's location is closer to the deployed virtual weapon when the blast event was initiated.

18. The system of claim 16, wherein the blast event is initiated by a virtual ordinance weapon.

19. The system of claim 16, wherein the blast event is initiated by a virtual improvised explosive device weapon.

* * * * *